US010793289B2

(12) United States Patent
Cao

(10) Patent No.: US 10,793,289 B2
(45) Date of Patent: Oct. 6, 2020

(54) OPTICAL PATH LENGTH ADJUSTMENT

(71) Applicant: SZ DJI TECHNOLOGY CO., LTD., Shenzhen (CN)

(72) Inventor: Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/136,801

(22) Filed: Sep. 20, 2018

(65) Prior Publication Data

US 2019/0031370 A1 Jan. 31, 2019

Related U.S. Application Data

(63) Continuation of application No. PCT/CN2016/077652, filed on Mar. 29, 2016.

(51) Int. Cl.
*G03B 13/32* (2006.01)
*G02B 7/04* (2006.01)
*B64D 47/08* (2006.01)
*G02B 7/08* (2006.01)
*G02B 26/06* (2006.01)
*G02B 15/08* (2006.01)
*G03B 15/00* (2006.01)

(52) U.S. Cl.
CPC ............... *B64D 47/08* (2013.01); *G02B 7/08* (2013.01); *G02B 15/08* (2013.01); *G02B 26/06* (2013.01); *G03B 15/006* (2013.01); *B64C 2201/14* (2013.01)

(58) Field of Classification Search
CPC .................. G03B 15/006; G03B 2205/0046
See application file for complete search history.

(56) References Cited

U.S. PATENT DOCUMENTS

| 4,937,609 A | 6/1990 | Wakabayashi et al. |
| 2003/0002867 A1* | 1/2003 | Ojala ............... G02B 15/10 396/73 |

(Continued)

FOREIGN PATENT DOCUMENTS

| CN | 1782770 A | 6/2006 |
| CN | 103873770 A | 6/2014 |
| JP | 2006033716 A | 2/2006 |

OTHER PUBLICATIONS

The World Intellectual Property Organization (WIPO) International Search Report and Written Opinion for PCT/CN2016/077652 dated Jan. 5, 2017 10 pages.

*Primary Examiner* — Minh Q Phan
(74) *Attorney, Agent, or Firm* — Anova Law Group, PLLC

(57) ABSTRACT

A system for adjusting an optical path length includes a camera body having a camera body opening, an image sensor coupled to the camera body, and an optical device movably coupled to the camera body. The movable coupling of the optical device to the camera body includes a first coupling position of the optical device relative to the camera body and a second coupling position of the optical device relative to the camera body. In the first coupling position, the optical device is located at a position that intersects a path between the image sensor and the camera body opening. In the second coupling position of the optical device, the optical device is located at a position that does not intersect the path between the image sensor and the camera body opening.

14 Claims, 19 Drawing Sheets

(56) References Cited

U.S. PATENT DOCUMENTS

| | | | |
|---|---|---|---|
| 2003/0185551 A1* | 10/2003 | Chen | G02B 7/14 |
| | | | 396/73 |
| 2004/0245430 A1* | 12/2004 | Konishi | G02B 7/102 |
| | | | 250/201.2 |
| 2009/0046199 A1 | 2/2009 | Nanjo et al. | |
| 2009/0244310 A1* | 10/2009 | Kuwazoe | H04N 5/2258 |
| | | | 348/222.1 |
| 2012/0287274 A1* | 11/2012 | Bevirt | H04N 7/185 |
| | | | 348/144 |
| 2013/0028581 A1* | 1/2013 | Yeung | G03B 17/14 |
| | | | 396/75 |
| 2019/0086667 A1* | 3/2019 | Silver | G02B 6/122 |

* cited by examiner

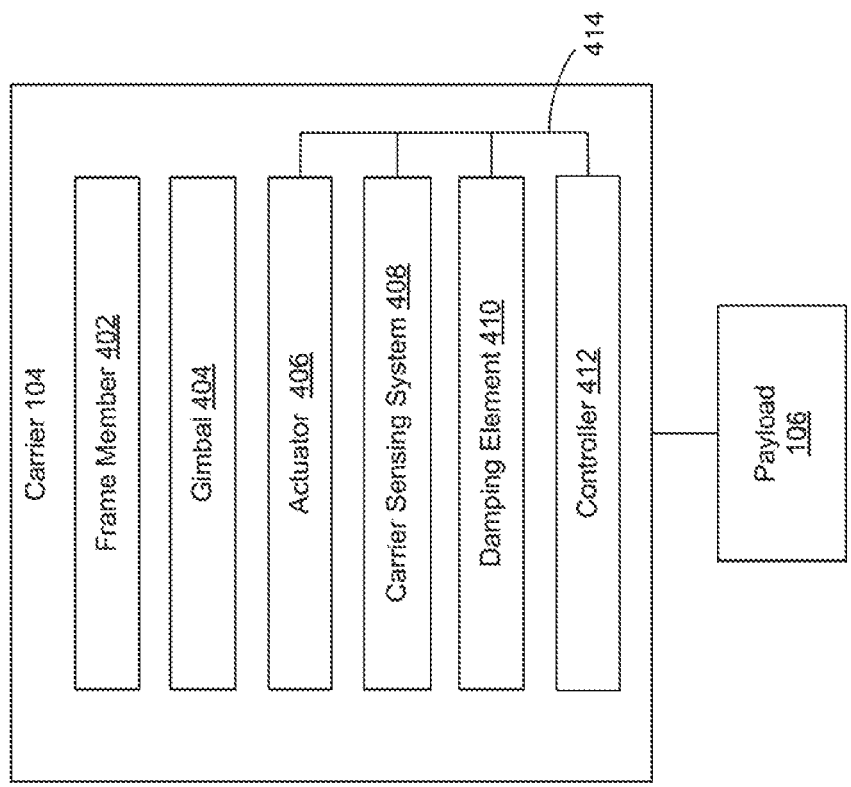
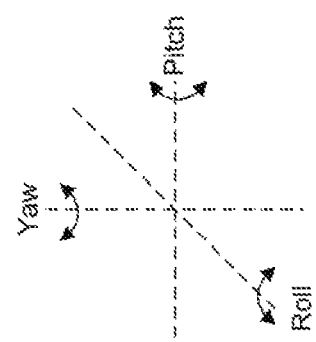
Figure 4

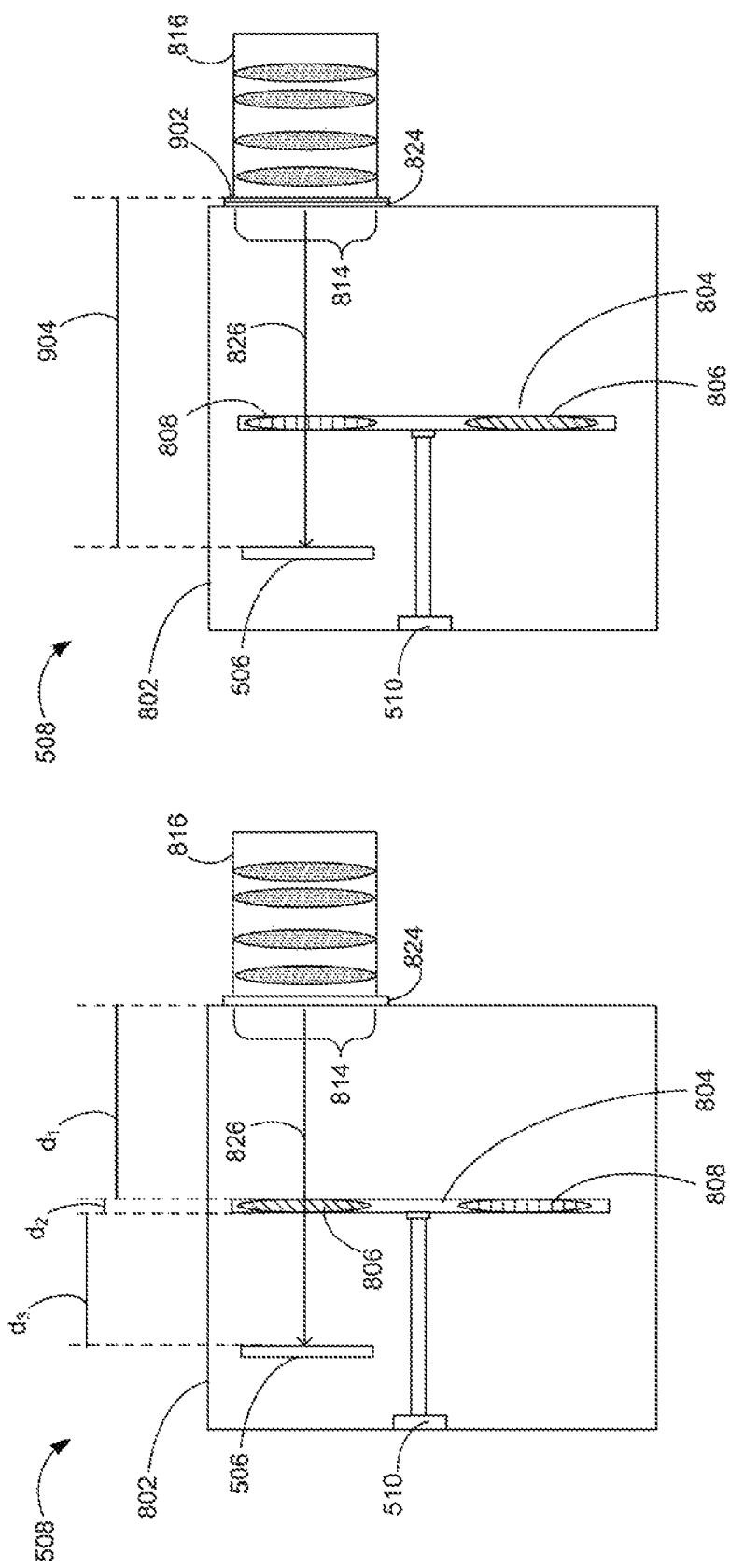

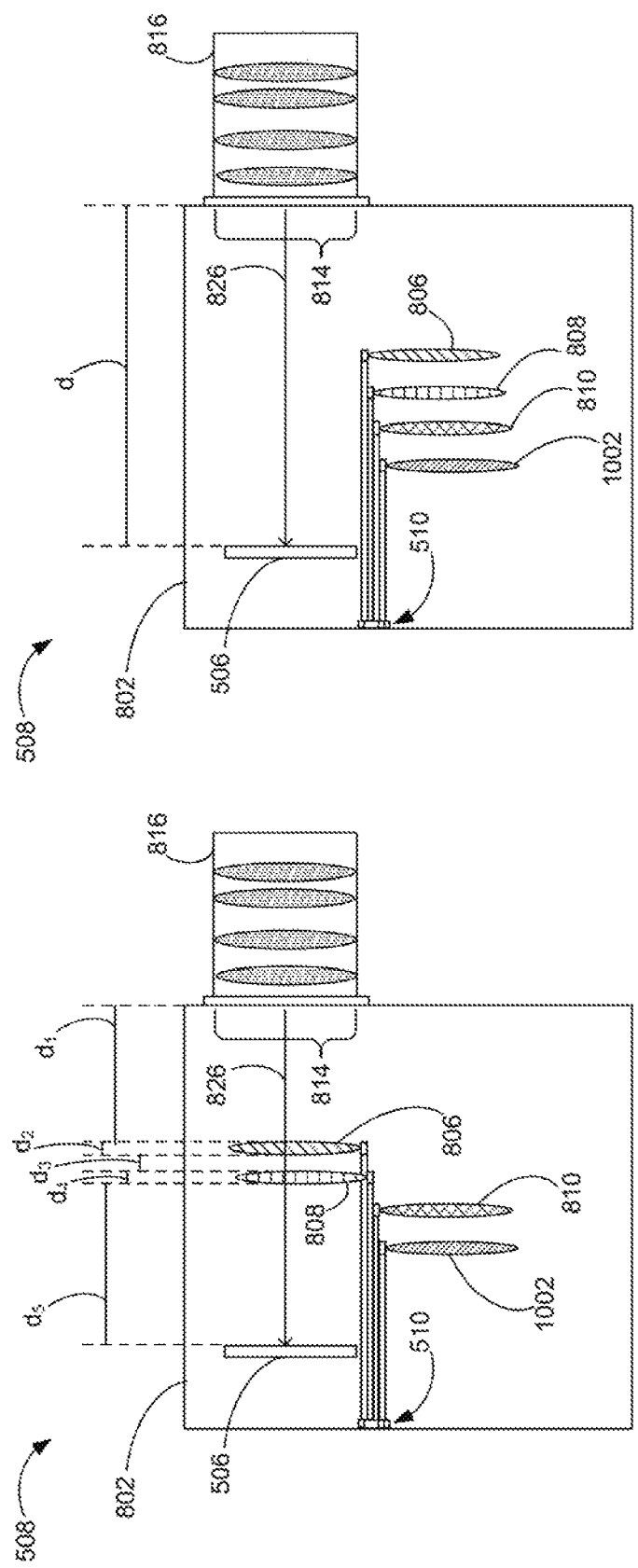

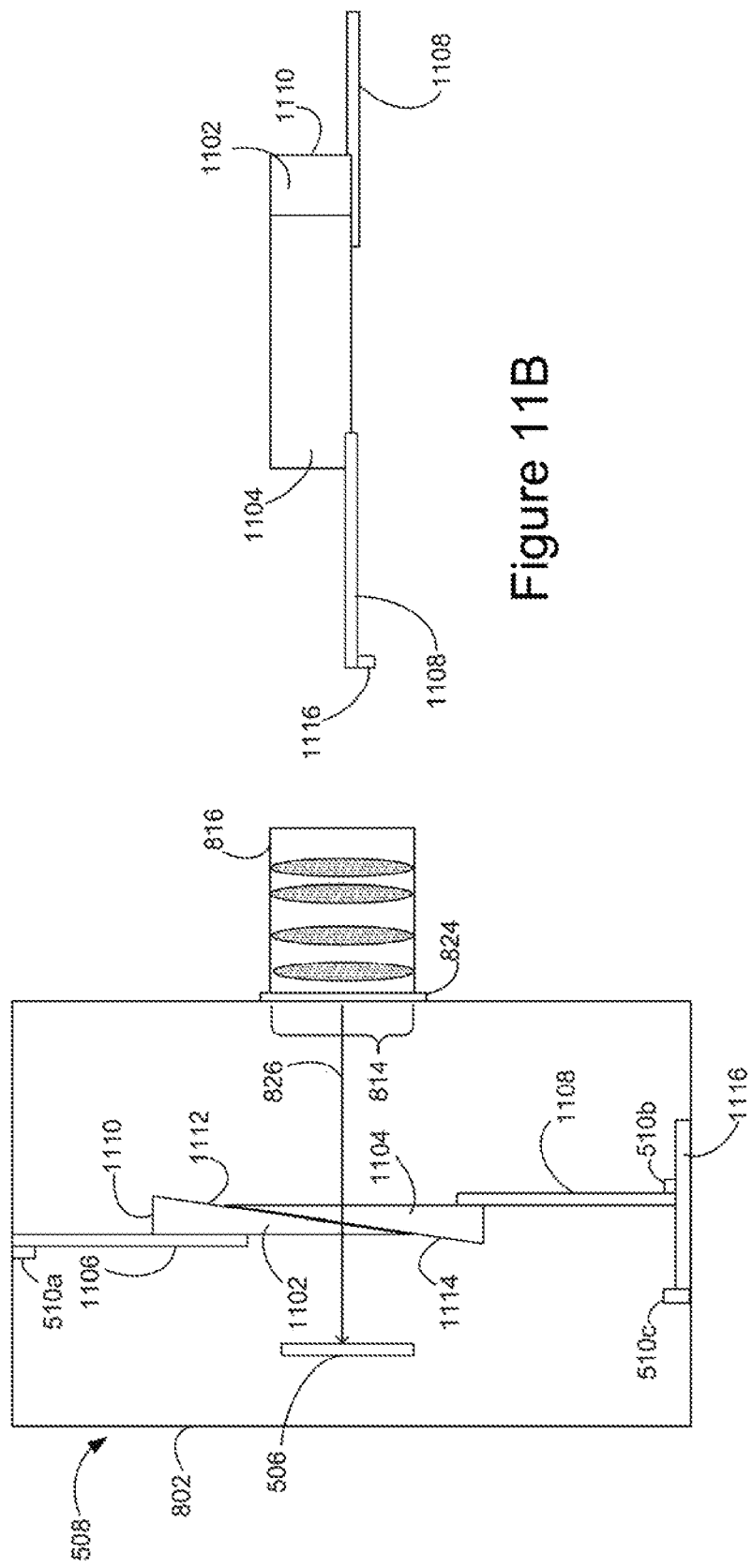

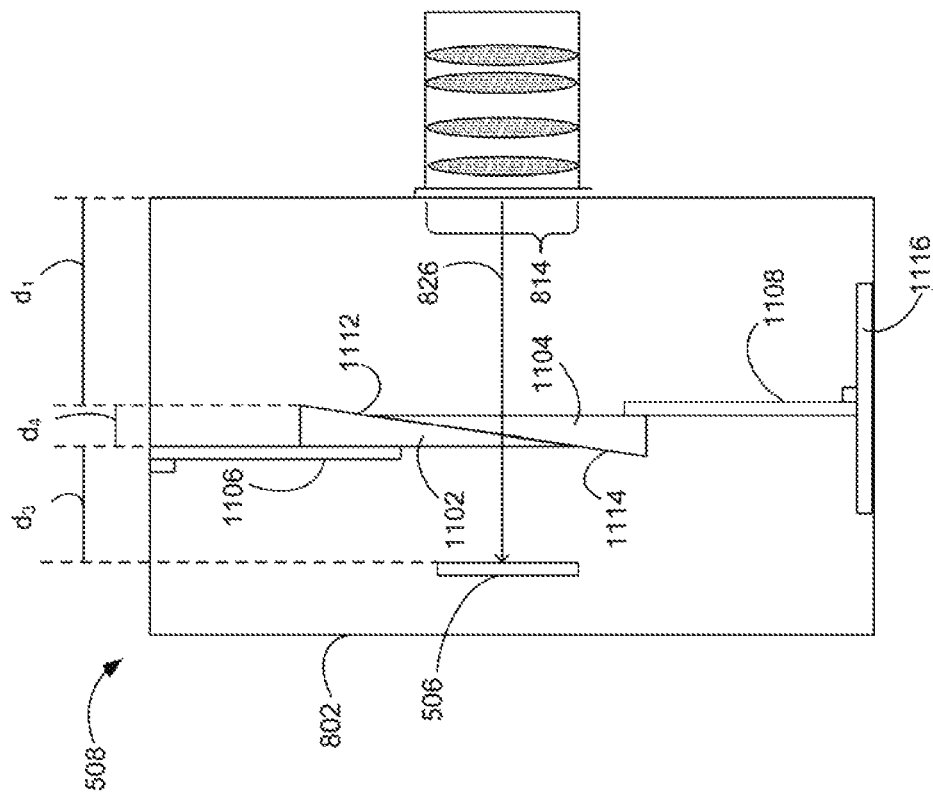
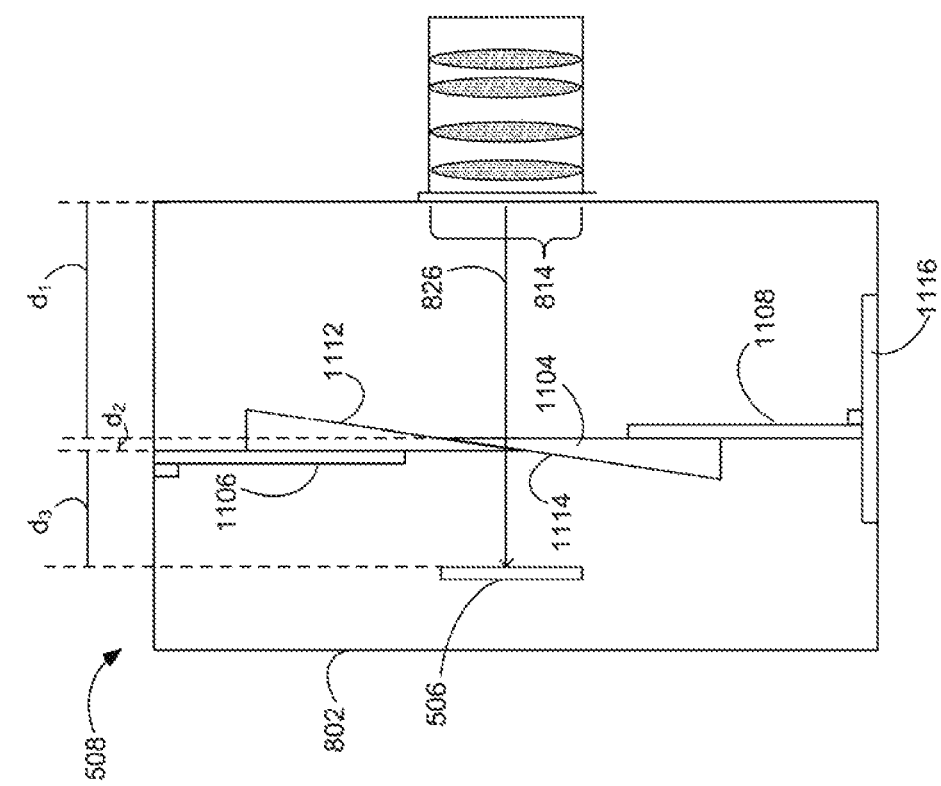

1400

1402
Move a first optical device of an imaging device to a first coupling position of a first optical device in accordance with a first received optical control instruction, wherein, in the first coupling position of the first optical device, the first optical device is located at a position that intersects a path between the image sensor and the camera body opening

1404
Move the first optical device to a second coupling position of the first optical device in accordance with a second received optical control instruction, wherein, in the second coupling position of the first optical device, the first optical device is located at a position that does not intersect the path between the image sensor and the camera body opening

1406
The first coupling position of the first optical device corresponds to a first optical path length between the image sensor and the camera body opening and the second coupling position of the first optical device corresponds to a second optical path length between the image sensor and the camera body opening that is different from the first optical path length between the image sensor and the camera body opening.

1408
Move a second optical device of the imaging device to a first coupling position of the second optical device in accordance with a third received optical control instruction, wherein, in the first coupling position of the second optical device, the second optical device is located at a position that intersects a path between the image sensor and the camera body opening

1410
The first optical device is in the first coupling position of the first optical device and, simultaneously, the second optical device is in the first coupling position of the second optical device, resulting in a third optical path length between the image sensor and the camera body opening.

1412
Move the second optical device to a second coupling position of the second optical device in accordance with a fourth received optical control instruction, wherein, in the second coupling position of the second optical device, the second optical device is located at a position that does not intersect the path between the image sensor and the camera body opening

1414
The first optical device is in the second coupling position of the first optical device and, simultaneously, the second optical device is in the second coupling position of the second optical device, resulting in a fourth optical path length between the image sensor and the camera body opening.

1602
Receive an optical control instruction to move a first optical device that is movably coupled to a camera body from a first position to a second position, wherein when the first optical device is in the first position, a first optical path length occurs between an image sensor coupled to the camera body and a camera body opening of the camera body

1604
In response to receiving the optical control instruction, move the first optical device from the first position to the second position to produce a second optical path length, different from the first optical path length, between the image sensor and the camera body opening

1606
The imaging device includes a second optical device; the first optical device and the second optical device are mounted to a platform; and the method further comprises rotating the platform in a plane that is orthogonal to a path between the image sensor and the camera body opening

1608
The first optical device is at the first position when the platform has a first rotational position relative to the camera body; and the first optical device is at the second position when the platform has a second rotational position relative to the camera body

1610
The imaging device includes a second optical device; and the first optical device comprises a first optical element that comprises a first surface; the second optical device comprises a second optical element that comprises a second surface; and the method further comprises moving the first optical device relative to the second optical device such that the first surface is continually in contact with the second surface

Figure 16

OPTICAL PATH LENGTH ADJUSTMENT

CROSS-REFERENCE TO RELATED APPLICATION

This application is a continuation of International Application No. PCT/CN2016/077652, filed on Mar. 29, 2016, the entire contents of which are incorporated herein by reference.

TECHNICAL FIELD

The disclosed embodiments relate generally to camera optics and more particularly, but not exclusively, to adjusting an optical path length between an image sensor of a camera and a camera body opening of the camera.

BACKGROUND

Many traditional cameras have a lens mount that allows interchangeable lenses with varying focal lengths to be mounted to the camera body. Cameras are a sought-after feature of unmanned aerial vehicles (UAVs). In a UAV, lenses with varying properties are desirable to obtain varying focal lengths and other optical properties. Changing optical properties of a UAV camera presents unique challenges, particularly if the changes are to be made while the UAV is in flight. For example, shifting weight from one location to another location inside the UAV while the UAV is in flight can adversely impact flight control for the UAV. It is desirable to have an adjustable optical system for a UAV that allows adjustments of the optical system to be made while the UAV is in flight.

SUMMARY

There is a need for systems and methods for optical path length adjustment for a movable object. Such systems and methods optionally complement or replace conventional methods for optical path length adjustment.

In accordance with some embodiments, a system for adjusting an optical path length comprises a camera body and an image sensor coupled to the camera body. A first optical device is movably coupled to the camera body. The movable coupling of the first optical device to the camera body comprises: a first coupling position of the first optical device relative to the camera body in which the first optical device is located at a position that intersects a path between the image sensor and a camera body opening, and a second coupling position of the first optical device relative to the camera body in which the first optical device is located at a position that does not intersect the path between the image sensor and the camera body opening.

In accordance with some embodiments, a computer readable storage medium stores one or more programs, the one or more programs comprising instructions, which when executed, cause an imaging device to; receive a first optical control instruction, and, in accordance with a determination that the first optical control instruction is for moving a first optical device to a first coupling position relative to a camera body, move the first optical device to the first coupling position. In the first coupling position, the first optical device intersects a path between an image sensor coupled to the camera body and a camera body opening of the camera body. In accordance with a determination that the first optical control instruction is for moving the first optical device to a second coupling position relative to the camera body, the instructions cause the imaging device to move the first optical device to the second coupling position. In the second coupling position, the first optical device is located at a position that does not intersect the path between the image sensor and the camera body opening.

In accordance with some embodiments, a method for controlling an imaging device that comprises a camera body, an image sensor coupled to the camera body, and a first optical device that is movably coupled to the camera body comprises: moving the first optical device to a first coupling position of the first optical device in accordance with a first received optical control instruction, wherein, in the first coupling position of the first optical device, the first optical device is located at a position that intersects a path between the image sensor and the camera body opening; and moving the first optical device to a second coupling position of the first optical device in accordance with a second received optical control instruction, wherein, in the second coupling position of the first optical device, the first optical device is located at a position that does not intersect the path between the image sensor and the camera body opening.

In accordance with some embodiments, an unmanned aerial vehicle (UAV) comprises a propulsion system; a camera body; an image sensor coupled to the camera body; and a first optical device that is movably coupled to the camera body. The movable coupling of the first optical device to the camera body comprises: a first coupling position of the first optical device relative to the camera body in which the first optical device is located at a position that intersects a path between the image sensor and a camera body opening, and a second coupling position of the first optical device relative to the camera body in which the first optical device is located at a position that does not intersect the path between the image sensor and the camera body opening.

In accordance with some embodiments, a system for adjusting an optical path length comprises a camera body, an image sensor coupled to the camera body, and a first optical device coupled to the camera body. The first optical device is movable relative to the camera body. The optical path length between the image sensor and the camera body opening is continuously adjusted by movement of the first optical device relative to the image sensor.

In accordance with some embodiments, a computer readable storage medium stores one or more programs, the one or more programs comprising instructions, which when executed, cause an imaging device to: receive an optical control instruction to move a first optical device that is movably coupled to a camera body; and in response to receiving the optical control instruction, move a first optical device relative to an image sensor that is coupled to a camera body, wherein an optical path length between the image sensor and a camera body opening of the camera body is continuously adjusted by the movement of the first optical device relative to the image sensor.

In accordance with some embodiments, a method for controlling an imaging device that comprises a camera body, an image sensor coupled to the camera body, and a first optical device movably coupled to the camera body, comprises: receiving a first optical control instruction; and moving the first optical device relative to the image sensor in response to receiving the first optical control instruction, wherein an optical path length between the image sensor and a camera body opening of the camera body is continuously adjusted by movement of the first optical device relative to the image sensor.

In accordance with some embodiments, an unmanned aerial vehicle (UAV) comprises a propulsion system, a camera body, an image sensor coupled to the camera body, and a first optical device that is coupled to the camera body. The first optical device is movable relative to the image sensor; and the optical path length between the image sensor and a camera body opening is continuously adjusted by movement of the first optical device relative to the image sensor.

In accordance with some embodiments, a system for adjusting an optical path length comprises a camera body, an image sensor coupled to the camera body, and a first optical device that is movably coupled to the camera body. When the first optical device is at a first position, a first optical path length occurs between the image sensor and a camera body opening; and moving the first optical device to a second position produces a second optical path length, different from the first optical path length, between the image sensor and the camera body opening.

In accordance with some embodiments, a computer readable storage medium stores one or more programs, the one or more programs comprising instructions, which when executed, cause an imaging device to: receive an optical control instruction to move a first optical device that is movably coupled to a camera body from a first position to a second position, wherein when the first optical device is in the first position, a first optical path length occurs between an image sensor coupled to the camera body and a camera body opening of the camera body; and in response to receiving the optical control instruction, move the first optical device from the first position to the second position to produce a second optical path length, different from the first optical path length, between the image sensor and the camera body opening.

In accordance with some embodiments, a method for controlling an imaging device that comprises a camera body, an image sensor coupled to the camera body, and a first optical device that is movably coupled to the camera body, comprises: receiving an optical control instruction to move a first optical device that is movably coupled to a camera body from a first position to a second position, wherein when the first optical device is in the first position, a first optical path length occurs between an image sensor coupled to the camera body and a camera body opening of the camera body; and, in response to receiving the optical control instruction, moving the first optical device from the first position to the second position to produce a second optical path length, different from the first optical path length, between the image sensor and the camera body opening.

In accordance with some embodiments, an unmanned aerial vehicle (UAV) comprises a propulsion system, a camera body, an image sensor coupled to the camera body, and a first optical device that is movably coupled to the camera body. When the first optical device is at a first position, a first optical path length occurs between the image sensor and a camera body opening. Moving the first optical device to a second position produces a second optical path length, different from the first optical path length, between the image sensor and the camera body opening.

BRIEF DESCRIPTION OF THE DRAWINGS

FIG. 4 illustrates a carrier, in accordance with some embodiments.

FIG. 9A illustrates a first coupling position of a first optical device relative to a camera body, in accordance with some embodiments.

FIG. 9B illustrates a second coupling position of the first optical device relative to the camera body, in accordance with some embodiments.

FIGS. 10A-10B are cross sectional views of an exemplary imaging device configurable to have multiple stacked configurations of optical devices, in accordance with some embodiments.

FIG. 11A is a cross sectional view of an exemplary imaging device that includes optical devices for continuous adjustment of an optical parameter, in accordance with some embodiments.

FIG. 11B is a front view of optical devices for continuous adjustment of an optical parameter, in accordance with some embodiments.

FIGS. 12A and 12B illustrate movement of optical devices for continuous adjustment of an optical parameter, in accordance with some embodiments.

FIGS. 14A-14B are a flow diagram illustrating a method for adjusting an optical path length, in accordance with some embodiments.

FIG. 16 is a flow diagram illustrating a method for adjusting an optical path length, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below.

Techniques related to optical adjustments for movable objects such as UAVs are described herein.

Figure 1A:
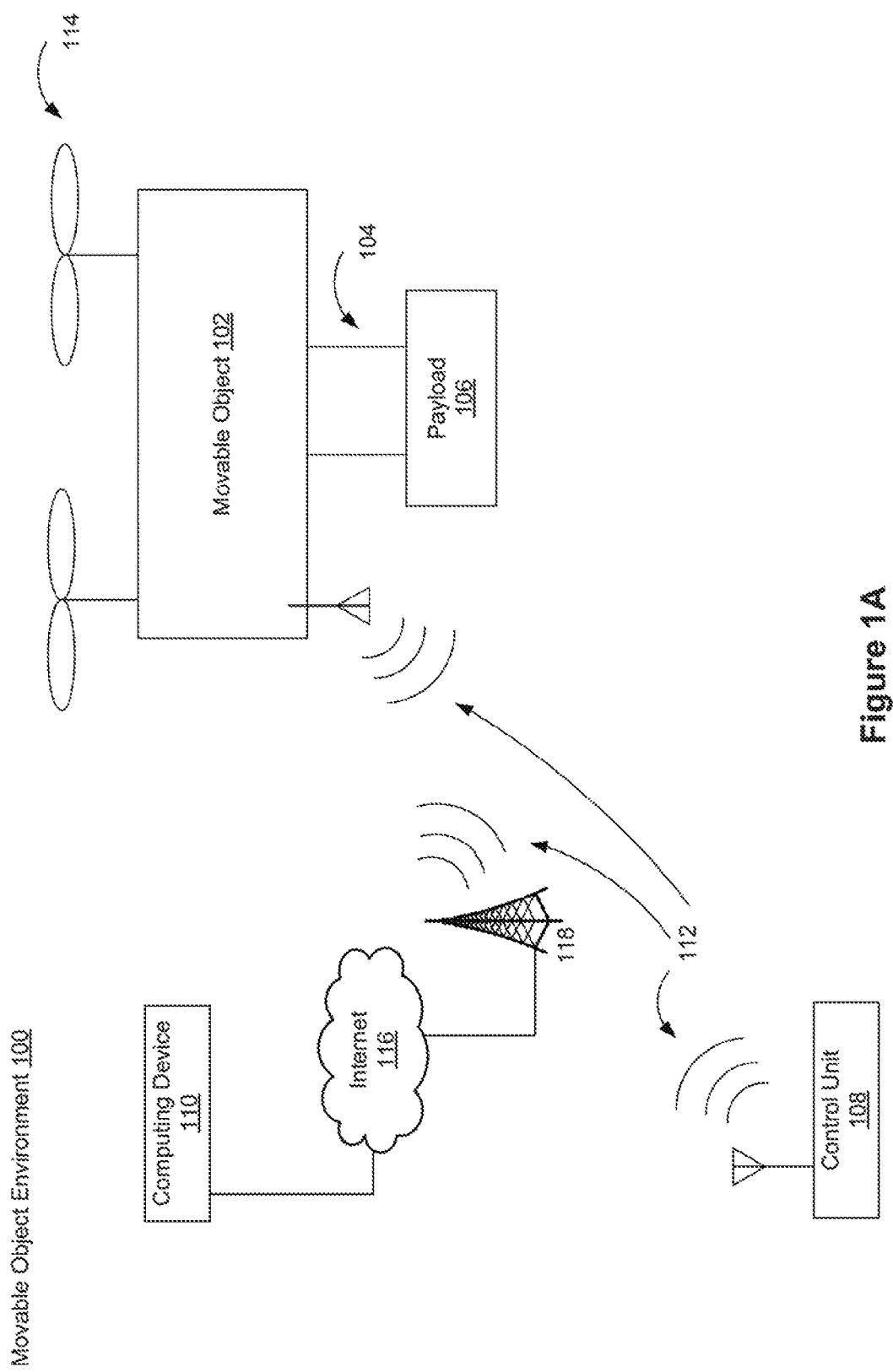
FIG. 1A-1B illustrate movable object environments, in accordance with some embodiments.

FIG. 1A illustrates a movable object environment 100, in accordance with some embodiments. Movable object environment 100 includes a movable object 102. In some embodiments, movable object 102 includes a carrier 104 and/or a payload 106.

In some embodiments, movable object 102 communicates with a control unit 108 and/or a computing device 110, e.g., via wireless communications 112. In some embodiments, movable object 102 receives information from control unit 108 and/or computing device 110. For example, information received by movable object 102 includes, e.g., control instructions for controlling parameters of movable object 102. In some embodiments, movable object 102 transmits information to control unit 108 and/or computing device 110. For example, information transmitted by movable object 102 includes, e.g., images and/or video captured by movable object 102.

In some embodiments, communications between computing device 110 and movable object 102 are transmitted via a network (e.g., Internet 116) and/or a wireless signal transmitter (e.g., a long range wireless signal transmitter) such as cellular tower 118. In some embodiments, a satellite (not shown) is a component of internet 116 and/or is used in addition to or in lieu of cellular tower 118.

Control instructions include, e.g., navigation instructions for controlling navigational parameters of movable object 102 such as position, orientation, attitude, and/or one or more movement characteristics of movable object 102, carrier 104, and/or payload 106. In some embodiments, control instructions include instructions directing movement of one or more of movement mechanisms 114. For example, control instructions are used to control flight of a UAV.

In some embodiments, control instructions include information for controlling operations (e.g., movement) of carrier 104. For example, control instructions are used to control an actuation mechanism of carrier 104 so as to cause angular and/or linear movement of payload 106 relative to movable object 102. In some embodiments, control instructions adjust movement of movable object 102 with up to six degrees of freedom.

Figure 3:
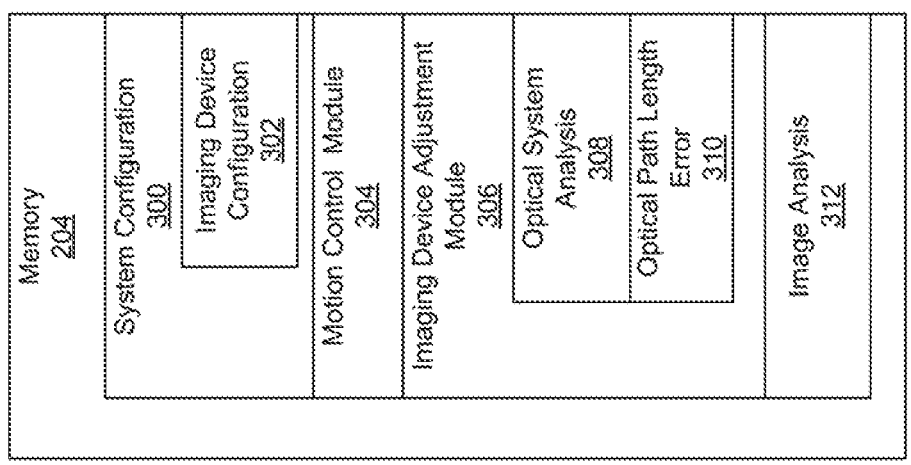
FIG. 3 is a block diagram illustrating an implementation of memory of a movable object, in accordance with some embodiments.

In some embodiments, control instructions are used to adjust one or more operational parameters for payload 106. For example, control instructions include instructions for adjusting an optical parameter (e.g., an optical parameter of an imaging device 508 (FIG. 5), such as a camera, of payload 106). In some embodiments, control instructions include instructions for adjusting imaging properties, e.g., imaging properties as described with regard to imaging device configuration 302 (FIG. 3). In some embodiments, control instructions include instructions for image device functions, such as capturing an image, initiating/ceasing video capture, powering an imaging device 508 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 508.

In some embodiments, when control instructions are received by movable object 102, the control instructions change parameters of and/or are stored by memory 204 (FIG. 3).

Figure 1B:
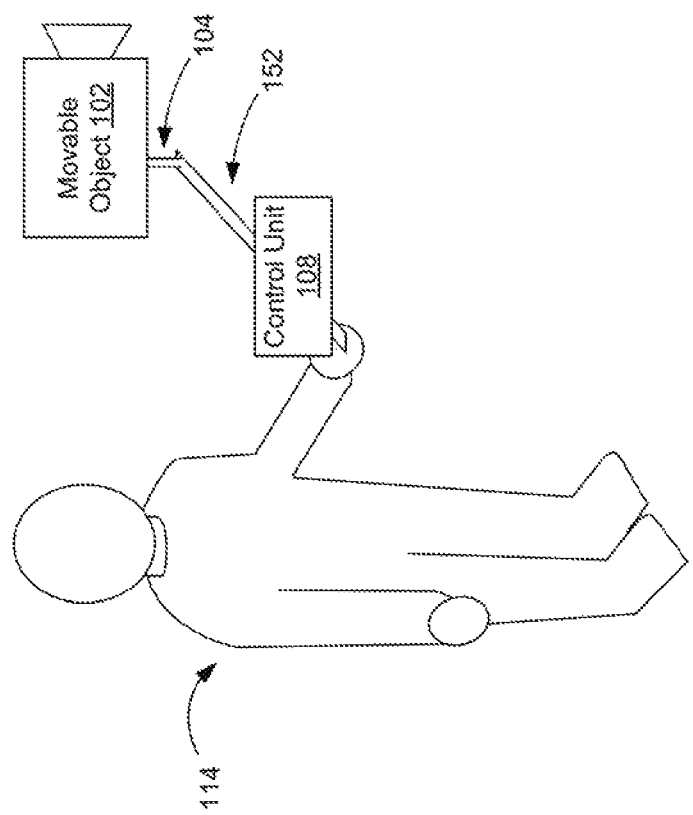

FIG. 1B illustrates a movable environment 150, in accordance with some embodiments. In movable object environment 150, movable object 102 is moved by a movement mechanism 114 that is remote from movable object 102, e.g., a person, animal, vehicle, dolly, and/or other moving device. For example, movable object 102 is a device that is handheld and/or wearable. In some embodiments, movable object is coupled (e.g., via carrier 104) to a support structure 152 that is handheld and/or wearable.

In some embodiments, a carrier 104 is coupled to movable object 102. In some embodiments, carrier 104 includes one or more mechanisms that allow movable object 102 to move relative to a movement mechanism 114 and/or relative to support structure 152. In some embodiments, movable object 102 is coupled to support structure 152 via a carrier 104 that includes a gimbal.

In some embodiments, movable object 102 is communicatively coupled to control unit 108 via a wired and/or wireless connection. In some embodiments, information transmitted from control unit 108 to movable object includes, e.g., control instructions for altering one or more operating parameters of movable object 102. For example, movable object 102 receives control instructions for altering an optical parameter of an imaging device of movable object 102. In some embodiments, information transmitted from movable object 102 to control unit 108 includes, e.g., image and/or video data captured by movable object 102.

Figure 2A:
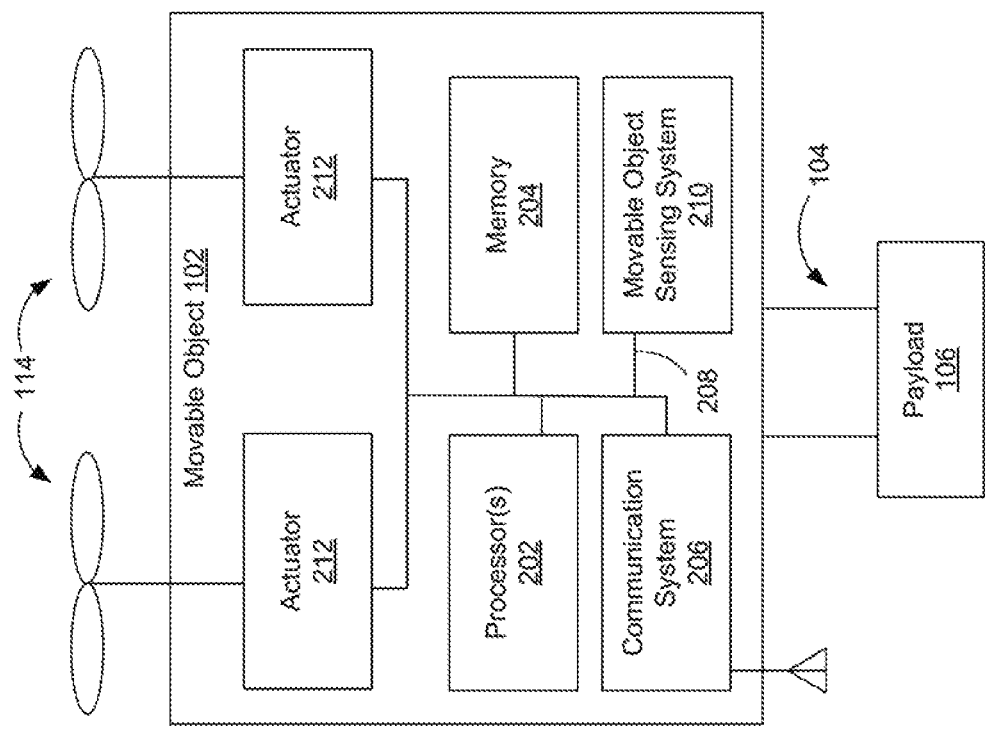
FIG. 2A illustrates a movable object in the movable object environment of FIG. 1A, in accordance with some embodiments.

FIG. 2A illustrates an exemplary movable object 102 in a movable object environment 100, in accordance with some embodiments. The movable object 102 typically includes one or more processing units 202, a memory 204, a communication system 206, a movable object sensing system 210, and a communication bus 208 for interconnecting these components.

In some embodiments, movable object is a UAV and includes components to enable flight and/or flight control. In some embodiments, movable object 102 includes communication system 206 with one or more network or other communications interfaces, movement mechanisms 114, and/or movable object actuators 212, which are optionally interconnected with one or more other components of movable object 102 via communication bus 208. Although movable object 102 is depicted as an aircraft, this depiction is not intended to be limiting, and any suitable type of movable object can be used.

In some embodiments, movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). Movement mechanisms 114 include one or more movement mechanism types such as rotors, propellers, blades, engines, motors, wheels, axles, magnets, nozzles, and so on. Movement mechanisms 114 are coupled to movable object 102 at, e.g., the top, bottom, front, back, and/or sides. In some embodiments movement mechanisms 114 of a single movable object 102 include multiple movement mechanisms of the same type. In some embodiments, movement mechanisms 114 of a single movable object 102 include multiple movement mechanisms with different movement mechanism types. Movement mechanisms 114 are coupled to movable object 102 (or vice-versa) using any suitable means, such as support elements (e.g., drive shafts) and/or other actuating elements (e.g., movable object actuators 212). For example, a movable object actuator 212 receives control signals from processor(s) 202 (e.g., via control bus 208) that activates the movable object actuator 212 to cause movement of a movement mechanism 114. For example, processor(s) 202 include an electronic speed controller that provides control signals to a movable object actuator 212.

In some embodiments, the movement mechanisms 114 enable movable object 102 to take off vertically from a surface or land vertically on a surface without requiring any horizontal movement of movable object 102 (e.g., without traveling down a runway). In some embodiments, movement mechanisms 114 are operable to permit movable object 102 to hover in the air at a specified position and/or orientation. In some embodiments, one or more of the movement mechanisms 114 are controllable independently of one or more of the other movement mechanisms 114. For example, when movable object 102 is a quadcopter, each rotor of the quadcopter is controllable independently of the other rotors of the quadcopter. In some embodiments, multiple movement mechanisms 114 are configured for simultaneous movement.

In some embodiments, movement mechanisms 114 include multiple rotors that provide lift and/or thrust to movable object 102. The multiple rotors are actuated to provide, e.g., vertical takeoff, vertical landing, and hovering capabilities to movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of movable object 102 (e.g., with respect to up to three degrees of translation and/or up to three degrees of rotation).

Communication system 206 enables communication with control unit 108 and/or computing device 110, e.g., via wireless signals 112. The communication system 206 includes, e.g., transmitters, receivers, and/or transceivers for wireless communication. In some embodiments, the communication is one-way communication, such that data is only received by movable object 102 from control unit 108 and/or computing device 110, or vice-versa. In some embodiments, communication is two-way communication, such that data is transmitted in both directions between movable object 102 and control unit 108 and/or computing device 110. In some embodiments, movable object 102, control unit 108, and/or the computing device 110 are connected to the Internet 116 or other telecommunications network, e.g., such that data generated by movable object 102, control unit 108, and/or computing device 110 is transmitted to a server for data storage and/or data retrieval (e.g., for display by a website).

In some embodiments, sensing system 210 of movable object 102 includes one or more sensors. In some embodiments, one or more sensors of movable object sensing system 210 are mounted to the exterior, located within, or otherwise coupled to movable object 102. In some embodiments, one or more sensors of movable object sensing system 210 are components of carrier sensing system 408 and/or payload sensing system 502. Where sensing operations are described herein as being performed by movable object sensing system 210, it will be recognized that such operations are optionally performed by one or more sensors of carrier sensing system 408 and/or payload sensing system 502 in addition to or in lieu of one or more sensors of movable object sensing system 210.

Movable object sensing system 210 generates static sensing data (e.g., a single image captured in response to a received instruction) and/or dynamic sensing data (e.g., a series of images captured at a periodic rate, such as a video).

Figure 5:
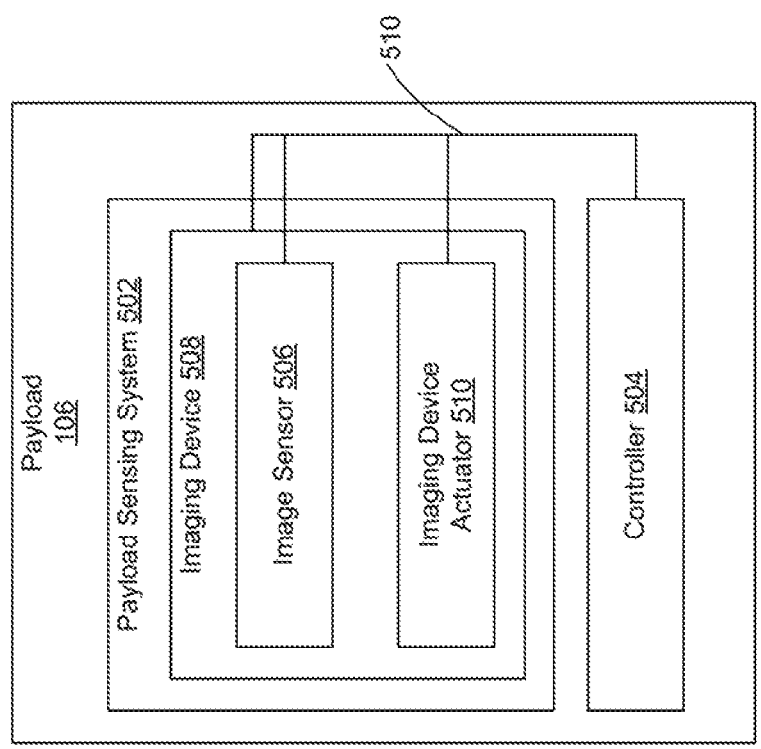
FIG. 5 illustrates an exemplary payload, in accordance with some embodiments.

In some embodiments, movable object sensing system 210 includes an image sensor. For example, movable object sensing system 210 includes an image sensor that is a component of an imaging device, such as a camera. In some embodiments, movable object sensing system 210 includes multiple image sensors, such as a pair of image sensors for stereographic imaging (e.g., a left stereographic image sensor and a right stereographic image sensor). In some embodiments, an image sensor and/or imaging device of movable object sensing system 210 has properties as described with regard to image sensor 506 and/or imaging device 508 of payload 106 (FIG. 5).

In some embodiments, movable object sensing system 210 includes one or more audio transducers. For example, an audio detection system includes an audio output transducer (e.g., a speaker) and/or an audio input transducer (e.g., a microphone, such as a parabolic microphone). In some embodiments, microphone and a speaker are used as components of a sonar system. A sonar system is used, for example, to provide a three-dimensional map of the surroundings of movable object 102.

In some embodiments, movable object sensing system 210 includes one or more infrared sensors. In some embodiments, a distance measurement system for measuring a distance from movable object 102 to an object or surface includes one or more infrared sensors, such a left infrared sensor and a right infrared sensor for stereoscopic imaging and/or distance determination.

In some embodiments, movable object sensing system 210 includes one or more global positioning system (GPS) sensors, motion sensors (e.g., accelerometers), rotation sensors (e.g., gyroscopes), inertial sensors, proximity sensors (e.g., infrared sensors) and/or weather sensors (e.g., pressure sensor, temperature sensor, moisture sensor, and/or wind sensor).

In some embodiments, sensing data generated by one or more sensors of movable object sensing system 210 and/or information determined using sensing data from one or more sensors of movable object sensing system 210 are transmitted to control unit 108 and/or computing device 110 (e.g., via communication system 206). In some embodiments, data generated by one or more sensors of movable object sensing system 210 and/or information determined using sensing data from one or more sensors of movable object sensing system 210 is stored by memory 204.

In some embodiments, movable object 102, control unit 108, and/or computing device 110 use sensing data generated by sensors of sensing system 210 to determine information such as a position of movable object 102, an orientation of movable object 102, movement characteristics of movable object 102 (e.g., angular velocity, angular acceleration, translational velocity, translational acceleration and/or direction of motion along one or more axes), and/or proximity of movable object 102 to potential obstacles, targets, weather conditions, locations of geographical features and/or locations of manmade structures.

Figure 2B:
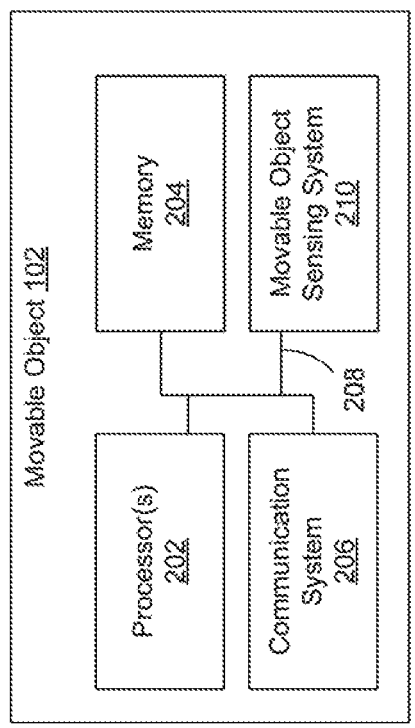
FIG. 2B illustrates a movable object in the movable object environment of FIG. 1B, in accordance with some embodiments.

FIG. 2B illustrates an exemplary movable object 102 in a movable object environment 150, in accordance with some embodiments. A movable object 102 in movable object environment 150 is moved by a movement mechanism 114 that is remote from movable object 102 (e.g., as described with regard to FIG. 1B). Movable object 102 of movable object environment 150 includes one or more processing units 202, a memory 204, a sensing system 210, and a communication bus 208 for interconnecting these components. In some embodiments, movable object 102 is communicatively coupled to a control unit 108, e.g., via a communication system 206.

FIG. 3 is a block diagram illustrating an implementation of memory 204 of movable object 102, in accordance with some embodiments. One or more elements described with regard to FIG. 3 are optionally stored by control unit 108, computing device 110, and/or another device. In some embodiments, imaging device 508 includes memory that stores one or more parameters described with regard to memory 204.

In some embodiments, memory 204 stores a system configuration 300. System configuration 300 includes one or more system settings (e.g., as configured by a manufacturer, administrator, and/or user). For example, identifying information for movable object 102 is stored as a system setting of system configuration 300.

In some embodiments, system configuration 300 includes imaging device configuration 302. Imaging device configuration 302 may store a parameter (e.g., as configured by a manufacturer, administrator, and/or user) for an imaging device 508 of payload 106 (FIG. 5). Optical parameters stored by imaging device configuration 302 include, e.g., optical path length, camera lens selection, optical device selection, optical device configuration, optical device movement distance, zoom level, and/or focus parameters (e.g., amount of focus, selecting autofocus or manual focus, and/or adjusting an autofocus target in an image). Imaging property parameters stored by imaging device configuration 302 include, e.g., image resolution, image size (e.g., image width and/or height), aspect ratio, pixel count, quality, focus distance, depth of field, exposure time, shutter speed, and/or white balance. In some embodiments, parameters stored by imaging device configuration 302 are updated in response to control instructions (e.g., received by movable object 102 from control unit 108 and/or computing device 110. In some embodiments, parameters stored by imaging device configuration 302 are updated in response to information received from movable object sensing system 210, carrier sensing system 408, carrier controller 412, payload sensing system 502, imaging device 508, and/or payload controller 504.

In some embodiments, memory 204 stores a motion control module 304. Motion control module 304 stores, e.g., control instructions. In some embodiments, control instructions stored by control module 304 are control instructions received from control unit 108 and/or computing device 110. Control instructions are used for, e.g., controlling operation of movement mechanisms 114, carrier 104, and/or payload 106.

In some embodiments, memory 204 includes imaging device adjustment module 306. Imaging device adjustment module 306 stores instructions for adjusting optical devices of movable object 102. In some embodiments, imaging device adjustment module 306 includes optical system analysis module 308 for determining whether an optical device adjustment is to be made, to determine one or more optical devices (e.g., optical devices 806, 808, 810, 818, 820, 822, 824, 1002, 1102, and/or 1104) to move, and/or to determine an amount of movement of an optical device. In some embodiments, imaging device adjustment module 306 uses data output from image analysis module 312 to make one or more determinations.

In some embodiments, optical device adjustment module 308 uses data received from control unit 108, computing device 110, a component of carrier 104, and/or a component of movable object 102, such as sensing system 210 to make one or more determinations. For example, a sensor of movable object sensing system 210 provides distance data indicating a distance to an object of which images are captured, such as a target. Based on the distance data, optical device adjustment module 308 determines, e.g., whether an optical device adjustment is to be made, one or more optical devices (e.g., optical devices 806, 808, 810, 818, 820, 822, 824, 1002, 1102, and/or 1104) to move, and/or an amount of movement of an optical device.

In some embodiments, image analysis module 312 determines an optical path length error, e.g., by performing a focus operation to determine a configuration of optical devices of imaging device 508 that produces focused and/or substantially focused images.

In some embodiments, imaging device adjustment module 306 stores optical path length error data 310. In some embodiments, optical path length error indicates an inherent aspect of an imaging device 508 and/or a determined aspect of an imaging device 508. In some embodiments, optical system analysis instructions 308 and/or optical device adjustment instructions use, determine, and/or configure optical path length error data 310. In some embodiments, optical path length error data 310 is configured by a manufacturer, administrator, and/or user.

In some embodiments, memory 204 includes an image analysis module 312. Image analysis module 312 performs processing operations on images, such as images captured by imaging device 508 (e.g., images captured by image sensor 506), or other sensor data.

The above identified modules or programs (i.e., sets of instructions) need not be implemented as separate software programs, procedures or modules, and thus various subsets of these modules may be combined or otherwise re-arranged in various embodiments. In some embodiments, memory 204 may store a subset of the modules and data structures identified above. Furthermore, memory 204 may store additional modules and data structures not described above. In some embodiments, the programs, modules, and data structures stored in memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of movable object 102 (and/or controller 412 of carrier 104 and/or controller 504 of payload 106). In some embodiments, one or more of the above identified elements is executed by one or more processors of a device remote from movable object 102, such as processor(s) 602 of control unit 108 and/or processor(s) 702 of computing device 110.

FIG. 4 illustrates a carrier 104, in accordance with some embodiments. Typically, carrier 104 is used to couple a payload 106 to movable object 102. In some embodiments, carrier 104 includes an element (e.g., gimbal 404) to isolate payload 106 from movement of movable object 102, support structure 152, and/or movement mechanism 114. In some embodiments, carrier 104 includes an element (e.g., carrier actuator 406 and/or controller 412) for controlling movement of payload 106 relative to movable object 102.

In some embodiments, carrier 104 includes a frame assembly including one or more frame members 402. In some embodiments, frame member 402 is coupled with movable object 102 and payload 106. In some embodiments, frame member 402 supports payload 106.

In some embodiments, carrier 104 includes one or more mechanisms, such as one or more carrier actuators 406, to cause movement of carrier 104 and/or payload 106. Carrier actuator 406 is, e.g., a motor, such as a hydraulic, pneumatic, electric, thermal, magnetic, and/or mechanical motor. In some embodiments, carrier actuator 406 causes movement of frame member 402. In some embodiments, carrier actuator 406 rotates payload 106 about one or more axes, such as three axes: X axis ("pitch axis"), Z axis ("roll axis"), and Y axis ("yaw axis"), relative to movable object 102. In some embodiments, carrier actuator 406 translates payload 106 along one or more axes relative to movable object 102.

In some embodiments, carrier 104 includes a carrier sensing system 408, e.g., for determining a state of carrier 104 and/or payload 106. Carrier sensing system 408 includes, e.g., motion sensors (e.g., accelerometers), rotation sensors (e.g., gyroscopes), potentiometers, and/or inertial sensors. Sensor data determined by carrier sensing system 408 includes, e.g., spatial disposition (e.g., position, orientation, or attitude) and/or movement information such as velocity (e.g., linear or angular velocity) and/or acceleration (e.g., linear or angular acceleration) of carrier 104 and/or payload 106. In some embodiments, sensing data and/or state information calculated from the sensing data are used as feedback data to control the movement of one or more components (e.g., frame member 402, carrier actuator 406) of carrier 104. A carrier sensor of carrier sensing system 408 is coupled to, e.g., frame member 402, carrier actuator 406, and/or payload 106. In some embodiments, a carrier sensor of carrier sensing system 408 (e.g., a potentiometer) measures movement of carrier actuator 406 (e.g., the relative positions of a motor rotor and a motor stator) and generates a position signal representative of the movement of the carrier actuator 406 (e.g., a position signal representative of relative positions of the motor rotor and the motor stator). In some embodiments, data generated by a carrier sensor 408 is received by processor(s) 202 and/or memory 204 of movable object 102.

In some embodiments, adjustment to the orientation, position, attitude, and/or one or more movement characteristics of movable object 102, carrier 104, and/or payload 106 is generated based at least in part on configurations (e.g., preset and/or user configured in system configuration 300) of movable object 102, carrier 104, and/or payload 106. For example, adjustment that involves rotation around two axes (e.g., yaw and pitch) is achieved solely by corresponding rotation of movable object 102 around the two axes (e.g., if payload 106 including imaging device 508 is rigidly coupled to movable object 102, and hence is not movable relative to movable object 102, and/or if payload 106 is coupled to movable object 102 via a carrier 104 that does not permit relative movement between payload 106 and movable object 102). The same two-axis adjustment is achieved by, e.g., combining adjustment to both movable object 102 and carrier 104 if carrier 104 permits payload 106 to rotate around at least one axis relative to movable object 102. In this case, carrier 104 is controlled to implement the rotation around one or two of the two axes required for the adjustment and movable object 120 is controlled to implement the rotation around one or two of the two axes. For example, carrier 104 includes, e.g., a one-axis gimbal 404 that allows payload 106 to rotate around one of the two axes required for adjustment while the rotation around the remaining axis is achieved by movable object 102. In some embodiments, the same two-axis adjustment is achieved by carrier 104 alone when carrier 104 permits payload 106 to rotate around two or more axes relative to movable object 102. For example, carrier 104 includes a two-axis or three-axis gimbal 404.

In some embodiments, carrier 104 includes controller 412. Controller 412 includes, e.g., one or more controllers and/or processors. In some embodiments, controller 412, carrier sensing system 408, and/or carrier actuator 406 are interconnected by control bus 414. In some embodiments, control bus 208 of movable object 102 includes control bus 414. In some embodiments, controller 412 receives instructions from processor(s) 202 of movable object 102. For example, controller 412 is connected to processor(s) 202 of movable object 102 via control bus 208. In some embodiments, controller 412 controls movement of carrier actuator 406, adjusts a parameter of carrier sensing system 408, receives data from carrier sensing system 408, and/or transmits data to processor(s) 202 of movable object 102, memory 204, control unit 108, and/or computing device 110.

FIG. 5 illustrates an exemplary payload 106, in accordance with some embodiments. In some embodiments, payload 106 includes a payload sensing system 502 and/or a controller 504. Payload sensing system 502 includes one or more sensors, such as image sensor 506. Typically, image sensor 506 is a component of an imaging device 508, such as a camera.

In some embodiments, payload 106 is coupled to movable object 102 via carrier 104. In some embodiments, payload 106 is coupled (e.g., rigidly coupled) to movable object 102 (e.g., coupled via carrier 104) such that payload 106 remains substantially stationary relative to movable object 102. For example, carrier 104 is coupled to payload 106 such that payload is not movable relative to movable object 102. In some embodiments, payload 106 is mounted directly to movable object 102 without requiring carrier 104. In some embodiments, payload 106 is located partially or fully within movable object 102.

Image sensor 506 is, e.g., a sensor that detects light, such as visible light, infrared light, and/or ultraviolet light. In some embodiments, one or more sensors of payload sensing system 502 captures, e.g., images, image streams (e.g., videos), stereographic images, and/or stereographic image streams (e.g., stereographic videos). In some embodiments, image sensor 506 has 1/2.3 inch format.

In some embodiments, imaging device 508 includes one or more optical devices (e.g., optical devices 806, 808, 810, 818, 820, 822, 824, 1002, 1102 and/or 1104) to affect the focus of light that arrives at image sensor 506. In some embodiments, image sensor 508 includes, e.g., semiconductor charge-coupled devices (CCD), active pixel sensors using complementary metal-oxide-semiconductor (CMOS) and/or N-type metal-oxide-semiconductors (NMOS, Live MOS). In some embodiments, imaging device 508 is configured to capture high-definition or ultra-high-definition videos (e.g., 720p, 1080i, 1080p, 1440p, 2000p, 2160p, 2540p, 4000p, 4320p, and so on).

In some embodiments, imaging device 508 includes an imaging device actuator 510 (e.g., 510a, 510b, 510c) that moves one or more optical devices (e.g., optical devices 806, 808, 810, 818, 820, 822, 824, 1002, 1102 and/or 1104). Actuator 510 is, e.g., a motor, such as a hydraulic, pneumatic, electric, thermal, magnetic, and/or mechanical motor. In some embodiments, actuator 510 rotates an optical device about one or more axes, relative to a camera body 802 and/or imaging sensor 506 of imaging device 508. In some embodiments, actuator 510 translates an optical device along one or more axes relative to a camera body 802 and/or imaging sensor 506 of imaging device 508.

In some embodiments, imaging device actuator 510 moves one or more optical devices in response to optical control instructions received from a processor (e.g., controller 504, processor(s) 202, controller 412, processor(s) 602, and/or processor(s) 702). For example, imaging device actuator 510 moves one or more optical devices in response to optical control instructions generated in response to user input (e.g., user input received via input device 608 of control unit 108 and/or user input received via input device 714 of computing device 110). In some embodiments, user input is received directly at movable object 102 (e.g., before movement mechanisms of movable object 102 are activated, such as via an input device of movable object 102).

In some embodiments, imaging device actuator 510 moves one or more optical devices based on output of a sensor, such as image sensor 506. For example, image analysis module 312 analyzes image output of image sensor 506 (e.g., one or more images, such as a series of images captured over a period of time) to determine whether an optical adjustment is needed. In some embodiments, image analysis module 312 performs an autofocus operation that includes analyzing image output of image sensor 506. In accordance with a determination that an optical adjustment is needed, image analysis module 312 moves imaging device actuator 510 and/or generates optical control instructions for moving imaging device actuator 510.

In some embodiments, payload 106 includes controller 504. Controller 504 includes, e.g., one or more controllers and/or processors. In some embodiments, controller 504, payload sensing system 502, imaging device 508, and/or image sensor 506 are interconnected by control bus 510. In some embodiments, control bus 208 of movable object 102 includes control bus 510. In some embodiments, controller 504 receives instructions from processor(s) 202 of movable object 102. For example, controller 504 is connected to processor(s) 202 via control bus 208. In some embodiments, controller 504 adjusts a parameter of a sensor of payload sensing system 502; receives data from a sensor of payload sensing system 502; and/or transmits data, such as image data from image sensor 506, to processor(s) 202, memory 204, control unit 108, and/or computing device 110.

In some embodiments, data generated by one or more sensors of payload sensor system 502 is stored, e.g., by memory 204. In some embodiments, data generated by payload sensor system 502 are transmitted to control unit 108 (e.g., via communication system 206). For example, video is streamed from payload 106 (e.g., imaging device 508) to control unit 108. In this manner, control unit 108 displays, e.g., real-time (or slightly delayed) video received from imaging device 508.

Figure 6:
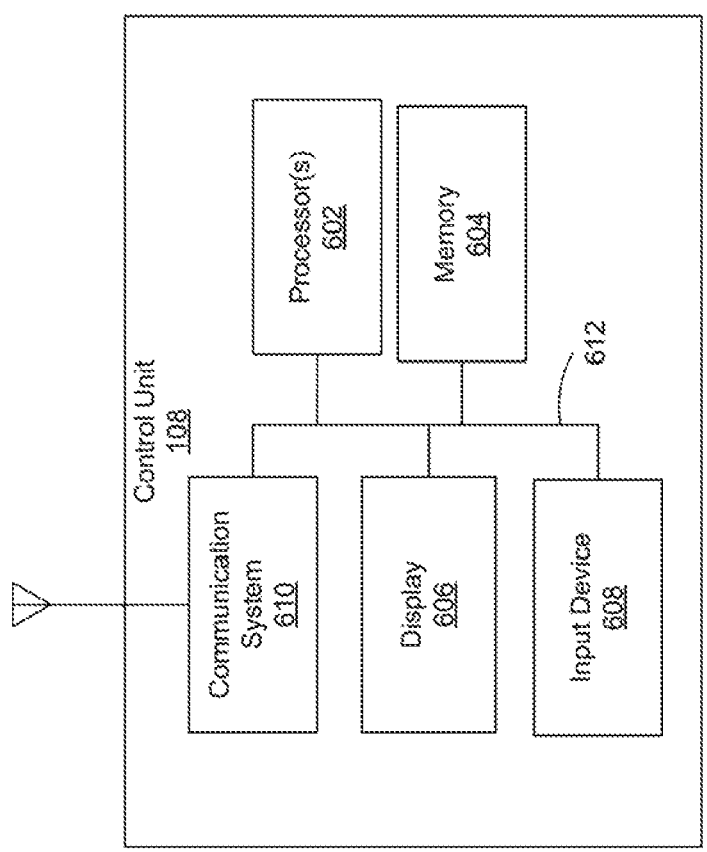
FIG. 6 illustrates an exemplary control unit, in accordance with some embodiments.

FIG. 6 illustrates an exemplary control unit 108, in accordance with some embodiments. In some embodiments, control unit 108 communicates with movable object 102, e.g., to provide control instructions to movable object 102 and/or to display information received from movable object 102. Although control unit 108 is typically a portable (e.g., handheld) device, control unit 108 need not be portable. In some embodiments, control unit 108 is a dedicated control device (e.g., for movable object 102), a laptop computer, a desktop computer, a tablet computer, a gaming system, a wearable device (e.g., glasses, gloves, and/or helmet), a microphone, a portable communication device (e.g., mobile telephone) and/or a combination thereof.

Control unit 108 typically includes one or more processors 602, memory 604, one or more input/output (I/O) interfaces (e.g., display 606 and/or input device 608), a communication system 610 (e.g., including one or more network or other communications interfaces), and/or one or more communication buses 612 for interconnecting these components.

In some embodiments, display 606 includes, e.g., LCD (liquid crystal display) technology, LPD (light emitting polymer display) technology, or LED (light emitting diode) technology, although other display technologies are used in other embodiments.

In some embodiments, display 606 displays information generated by movable object sensing system 210, memory 204, carrier sensing system 408, payload sensing system 502, and/or another system of movable object 102. For example, the display 606 displays information about movable object 102, carrier 104, and/or payload 106, such as position, attitude, orientation, movement characteristics of movable object 102, and/or distance between movable object 102 and another object (e.g., a target and/or an obstacle). In some embodiments, information displayed by display device 606 includes images captured by imaging device 508, tracking data (e.g., a graphical tracking indicator applied to a representation of a target, such as a box or other shape around the target shown to indicate that the target is currently being tracked), and/or indications of control data transmitted to movable object 102. In some embodiments, information displayed by display 606 is displayed in substantially real-time as information is received from movable object 102 and/or as image data is acquired.

In some embodiments, input device 608 includes, e.g., a joystick, switch, knob, sliding control, button, dial, keypads, keyboard, mouse, audio transducer (e.g., microphone for voice control system), motion sensor, and/or gesture control. In some embodiments, an I/O interface of control unit 108 includes a sensor (e.g., GPS sensor, and/or accelerometer), audio output transducer (e.g., speaker), and/or tactile output generator.

In some embodiments, a touchscreen display includes display 606 and input device 608. A touchscreen display and processor(s) 602 optionally detect contact and any movement or breaking thereof using any touch sensing devices including but not limited to capacitive, resistive, infrared, and surface acoustic wave technologies, as well as other proximity sensor arrays or other elements for determining one or more points of contact with the touchscreen display.

In some embodiments, input device 608 receives user input to control aspects of movable object 102, carrier 104, payload 106, and/or a component thereof. Such aspects include, e.g., attitude, position, orientation, velocity, acceleration, navigation, and/or tracking. For example, a position of an input device 608 (e.g., a position of a component of input device 608) is manually set by a user to a position corresponding to an input (e.g., a predetermined input) for controlling movable object 102. In some embodiments, input device 608 is manipulated by a user to input control instructions for controlling the navigation of movable object 102. In some embodiments, input device 608 is used to input a flight mode for movable object 102, such as auto pilot or navigation according to a predetermined navigation path.

In some embodiments, the user controls movable object 102, e.g., the position, attitude, and/or orientation of movable object 102, by changing a position of control unit 108

(e.g., by tilting or otherwise moving control unit 108). For example, a change in a position of control unit 108 is detected by, e.g., one or more inertial sensors, and output of the one or more inertial sensors is used to generate command data. In some embodiments, input device 608 is used to adjust an operational parameter of payload 106, such as a parameter of a payload sensing system 502 (e.g., to adjust a parameter of imaging device configuration 302) and/or a position of payload 106 relative to carrier 104 and/or movable object 102. In some embodiments, input device 608 is used to adjust an operational parameter of carrier 104 and/or a position of carrier 104 relative to payload 106 and/or movable object 102.

In some embodiments, input device 608 is used to indicate information about a target, e.g., to select a target to track and/or to indicate target type information. In some embodiments, input device 608 is used to input target tracking mode information for movable object 102 such as a manual tracking mode or an automatic tracking mode.

In some embodiments, input device 608 is used for interaction with image and/or other data displayed by display 606. For example, a user indicates a target to be imaged and/or one or more points in an image at which image focus is desired. In some embodiments, a user provides information to movable object sensing system 210, memory 204, carrier sensing system 408, payload sensing system 502, or another system of movable object 102 via interaction with input device 608 controls.

In some embodiments, control unit 108 includes an electronic device (e.g., a portable electronic device) and an input device 608 that is a peripheral device that is communicatively coupled (e.g., via a wireless and/or wired connection) and/or mechanically coupled to the electronic device. For example, control unit 108 includes a portable electronic device (e.g., a smartphone) and a remote control device (e.g., a standard remote control with a joystick) that is coupled to the portable electronic device. In some embodiments, an application executed by the electronic device generates control instructions based on input received at the peripheral device.

The communication system 610 enables communication with communication system 206 of movable object 102, communication system 710 of computing device 110, and/or a base station (e.g., computing device 110) via a wired and/or wireless communication connection. In some embodiments, the communication system 610 transmits control instructions (e.g., navigation control instructions and/or instructions for adjusting imaging device configuration 302). In some embodiments, the communication system 610 receives data (e.g., data from movable object sensing system 210, memory 204, carrier sensing system 408, payload sensing system 502, and/or another system of movable object 102).

In some embodiments, memory 604 stores instructions for generating control instructions automatically and/or based on input received via input device 608. The control instructions include, e.g., control instructions for operating movement mechanisms 114 of movable object 102 (e.g., to adjust the position, attitude, orientation, and/or movement characteristics of movable object 102, such as by providing control instructions to movable object actuator 212). In some embodiments, the control instructions are generated to set and/or adjust imaging device configuration 302. In some embodiments, control instructions include instructions for adjusting carrier 104 (e.g., instructions for adjusting carrier actuator 406, and/or a sensor of carrier sensing system 408 of carrier 104). In some embodiments, control instructions include instructions for adjusting payload 106 (e.g., instructions for adjusting a sensor of payload sensing system 502 and/or instructions for adjusting imaging device actuator 510). In some embodiments, control instructions include control instructions for adjusting the operations of one or more sensors of movable object sensing system 210.

In some embodiments, input device 608 receives user input to control one aspect of movable object 102 (e.g., the zoom of the imaging device 508) while a control application (e.g., instructions stored by memory 604 and executed by processor(s) 602) generates control instructions for adjusting another aspect of movable object 102. For example, input device 608 receives user input to control one or more movement characteristics of movable object 102 while the control application generates control instructions for adjust imaging device configuration 302. In this manner, a user is enabled to focus on controlling the navigation of movable object without having to provide input for adjusting optical properties and/or imaging parameters of imaging device 508.

Figure 7:
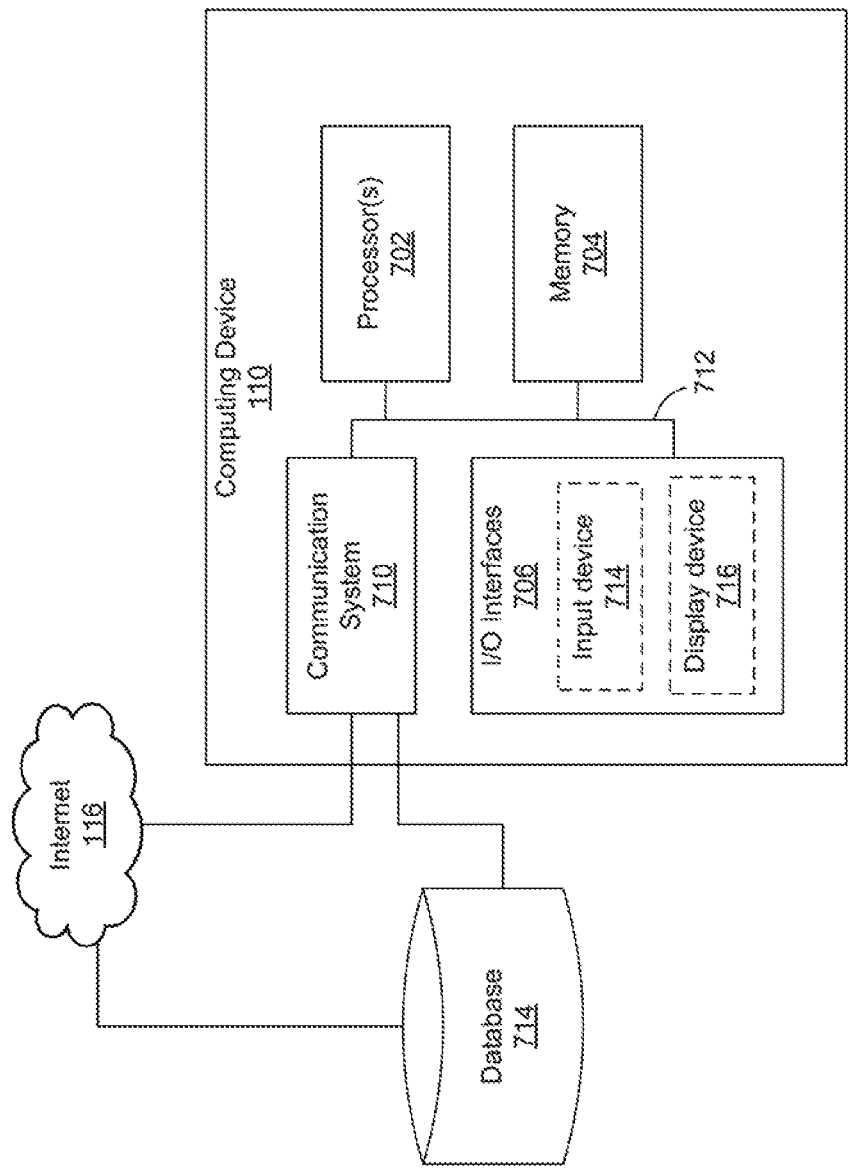
FIG. 7 illustrates an exemplary computing device for controlling movable object, in accordance with embodiments.

FIG. 7 illustrates an exemplary computing device 110 for controlling movable object 102, in accordance with embodiments. Computing device 110 is, e.g., a server computer, desktop computer, laptop computer, tablet, or other portable electronic device (e.g., a mobile telephone). Computing device 110 typically includes one or more processing units 702, memory 704, communication system 710 and one or more communication buses 712 for interconnecting these components. In some embodiments, computing device 110 includes input/output (I/O) interfaces 706, e.g., an input device 714 and/or a display 716.

In some embodiments, computing device 110 is a base station that communicates (e.g., wirelessly) with movable object 102 and/or control unit 108.

In some embodiments, computing device 110 provides data storage, data retrieval, and/or data processing operations, e.g., to reduce the processing power and/or data storage requirements of movable object 102 and/or control unit 108. For example, computing device 110 is communicatively connected to a database 714 (e.g., via communication system 710) and/or computing device 110 includes database 714 (e.g., database 714 is connected to communication bus 712). In some embodiments, computing device is used in lieu of or in addition to control unit 108 to perform any of the operations described with regard to control unit 108.

Communication system 710 includes one or more network or other communications interfaces. In some embodiments, computing device 110 receives data from control unit 108 and/or movable object 102 (e.g., from movable object sensing system 210, carrier sensing system 408, carrier controller 412, payload sensing system 503, imaging device 508, and/or payload controller 504). In some embodiments, computing device 110 transmits data to movable object 102 and/or control unit 108. For example, computing device provides control instructions to movable object 102.

Figure 8B:
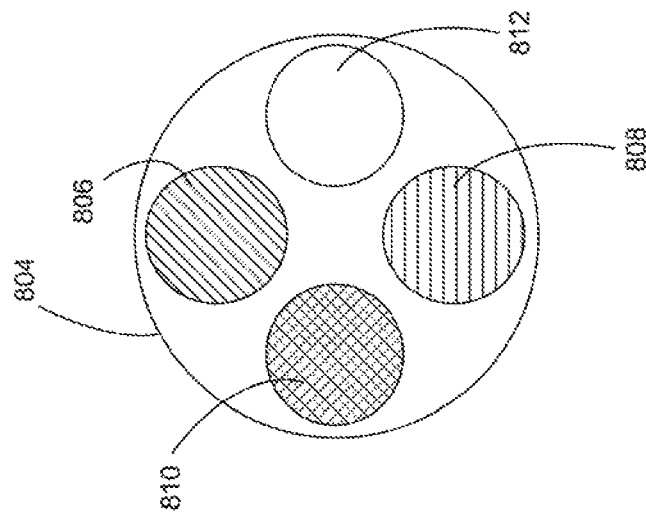
FIG. 8B illustrates an exemplary rotatable optical device mount, in accordance with some embodiments.
Figure 8A:
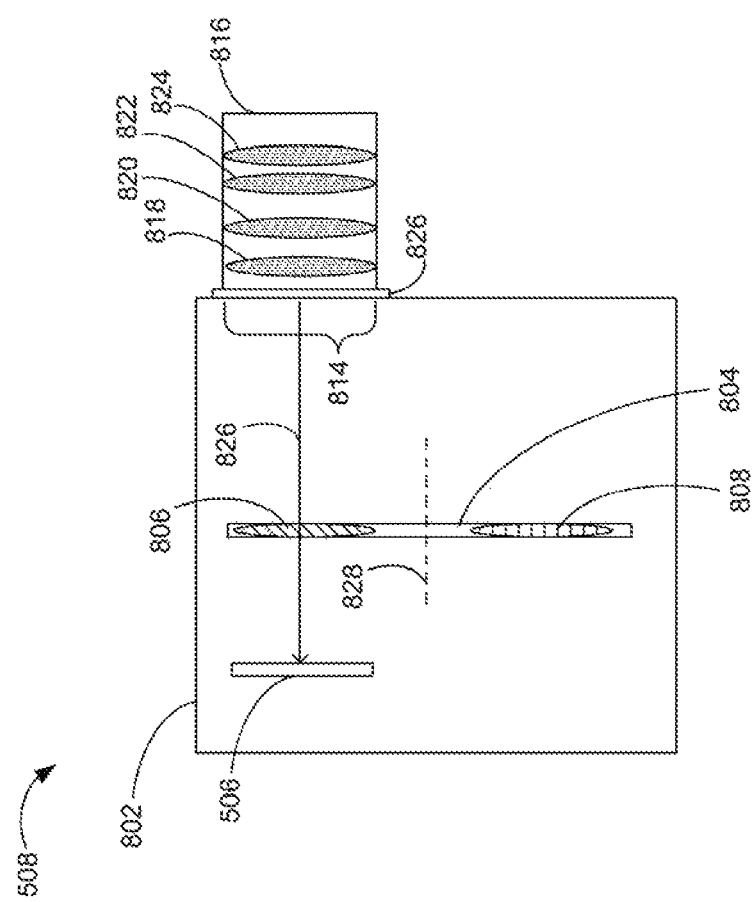
FIG. 8A is a cross sectional view of an exemplary imaging device that includes a rotatable optical device mount, in accordance with some embodiments.

FIG. 8A is a cross sectional view of an exemplary imaging device 508 that includes a rotatable optical device mount 804, in accordance with some embodiments. Imaging device 508 includes a camera body 802. Camera body 802 is, e.g., a body of movable object 102, a body mounted on and/or inside of movable object 102, a body coupled to carrier 104 (e.g., as a payload 106), and/or a body coupled to a payload 106. Camera body 802 is, e.g., a structure to which an image sensor 506 is coupled. Camera body 802 includes a camera body opening 814 that admits light into camera body 802. In some embodiments, camera body 802 is fabricated from a material that reduces or eliminates light penetration such that camera body 802 admits light only at camera body opening 814.

In some embodiments, one or more optical devices are coupled (e.g., fixedly, movably, and/or interchangeably mounted) to camera body 802. In some embodiments, one or more optical devices (e.g., first optical device 806, second optical device 808, and/or third optical device 810) are mounted on the interior of camera body 802. In some embodiments, one or more optical devices (e.g., first optical device 806, second optical device 808, and/or third optical device 810) are mounted such that, at least at some times, the optical device intersects a path (e.g., path 826) between image sensor 506 and camera body opening 814. For example, in FIG. 8A, first optical device 806 intersects path 826 between camera body opening 814 and image sensor 506. In some embodiments, a camera lens 816 mounted at a position corresponding to camera body opening 814 includes one or more optical devices (e.g., component lenses 818, 820, 822, and/or 823).

In some embodiments, one or more optical devices (e.g., 806, 808, 810, 1002, 1102, and/or 1104) are a lens. A lens is, e.g., a material having curved surfaces that give rise to lens properties, such as causing light rays to converge (e.g., at a focal length) and/or diverge.

In some embodiments, one or more optical devices (e.g., 806, 808, 810, 1002, 1102, and/or 1104) are not a lens. For example, the surfaces of the optical device that are orthogonal to path 826 between image sensor 506 and camera body opening 814 are flat surfaces. In some embodiments, an optical device that is not a lens does not cause light rays to converge or diverge.

In some embodiments, one or more optical devices (e.g., 806, 808, 810, 1002, 1102, and/or 1104) is fabricated from, e.g., glass and/or plastic. In some embodiments, an optical device includes a fluid-filled (e.g., liquid-filled or gas-filled) or vacuum chamber. Typically, an optical device is at least partially transparent to light.

In some embodiments, camera body 802 includes a lens mount 824 at a location corresponding to camera body opening 814. Lens mount 824 is used for mounting (e.g., detachably, adjustably, and/or fixedly mounting) camera lens 816 to camera body 802.

In some embodiments, one or more optical devices (e.g., first optical device 806, second optical device 808, and/or third optical device 810) are mounted in the same plane as a mounting device. For example, one or more optical devices are mounted to a rotating plane that rotates relative to camera body 802 and/or a planar mount that translates relative to camera body 802.

FIG. 8B illustrates an exemplary rotatable optical device mount 804, in accordance with some embodiments. In some embodiments, one or more optical devices (e.g., first optical device 806, second optical device 808, and/or third optical device 810) are mounted to a movable optical device mount, such as rotatable optical device mount 804, that is coupled (e.g., rotatably coupled) to camera body 802. In some embodiments rotatable optical device mount 804 rotates in a plane that is orthogonal to the path 826 between the image sensor 506 and the camera body opening 814. For example, rotatable optical device mount 804 rotates about an axis 828 (shown in FIG. 8A).

In some embodiments, first optical device 806 has at least one optical parameter (e.g., refractive index and/or focal length) that has a value different from the same optical parameter of second optical device 808. For example, first optical device 806 is made of a material that has a first refractive index and second optical device 810 is made of a material that has a second refractive index that is different form the first refractive index. In some embodiments, third optical device 810 has a third refractive index that is different from the refractive index of the first optical device 806 and the second optical device 808. In some embodiments, rotatable optical device mount 804 includes blank space 812, e.g., to provide optical parameters of air. In some embodiments, first optical device 808 has a first thickness and second optical device 810 has a second thickness that is different from the first thickness.

FIG. 9A illustrates a first coupling position of a first optical device 806 relative to camera body 802. In some embodiments, when first optical device 806 is in the first coupling position (of first optical device 806), first optical device 806 intersects path 826 between camera body opening 814 and image sensor 506. For example, rotatable optical device mount 804 is rotated to a first position in which first optical device 806 intersects the path 826 between camera body opening 814 and image sensor 506. In some embodiments, when first optical device 806 is in a first coupling position in which first optical device 806 intersects the path 826 between camera body opening 814 and image sensor 506, second optical device 808 is in a second coupling position (of second optical device 808) relative to camera body 802 that such that second optical device 808 does not intersect the path 826 between camera body opening 814 and image sensor 506.

FIG. 9B illustrates a second coupling position of a first optical device 806 relative to camera body 802. In some embodiments, when first optical device 806 is in the second coupling position, first optical device 806 does not intersect path 826 between camera body opening 814 and image sensor 506. For example, rotatable optical device mount 804 is rotated to a second position in which first optical device 806 does not intersect the path 826 between camera body opening 814 and image sensor 506. In some embodiments, when first optical device 806 is in a second coupling position (of first optical device 806) in which first optical device 806 does not intersect the path 826 between camera body opening 814 and image sensor 506, second optical device 808 is in a first coupling position (of second optical device 808) relative to camera body 802 such that second optical device 808 intersects the path 826 between camera body opening 814 and image sensor 506.

In some embodiments, first optical device 806 is moved from a first coupling position to a second coupling position in order to change an optical property, such as an optical path length, between camera body opening 814 and image sensor 506.

An optical path length (OPL) is the product of the geometric length d of the path light travels through a system (e.g., along path 826 between camera body opening 814 and image sensor 506) and the refractive index n of the medium through which the light propagates as light travels through the system:

$$OPL = nd$$

For example, when a first optical device 806 that has a refractive index $n_{fod}$ is in a first coupling position in which the first optical device 806 intersects the path 826 between camera body opening 814 and image sensor 506, the optical path length between camera body opening 814 and image sensor 506 is:

$$OPL \text{ (First Optical Device)} = n_{air}d_1 + n_{fod}d_2 + n_{air}d_3$$

In some embodiments (e.g., when the first optical device 806 is in the second coupling position), a second optical device 808 that has a refractive index $n_{sod}$ is in a first coupling position that intersects the path 826 between camera body opening 814 and image sensor 506, and the optical path length between camera body opening 814 and image sensor 506 is:

$$\text{OPL (Second Optical Device)} = n_{air}d_1 + n_{sod}d_2 + n_{air}d_3$$

When the refractive index $n_{fod}$ of first optical device 806 is different form the refractive index $n_{sod}$ of second optical device 808, OPL (First Optical Device) is different from OPL (Second Optical Device). In some other embodiments, first optical device 806 and second optical device 808 have different thickness, which also contribute to the difference between the two OPL values.

In this way, one or more optical devices (e.g., first optical device 806 and/or second optical device 808) act as a teleconverter to adjust imaging properties of imaging device 508.

In some embodiments, an optical path length is determined over distance $d_2$. In some embodiments, lens mount 824 includes a lens mount flange 902. In some embodiments, camera lens 312 is coupled to imaging device 508 via lens mount flange 902. In some embodiments, an optical path length is determined over flange focal distance 904 between image sensor 506 and lens mount flange 902.

In some embodiments, optical device 508 includes imaging device actuator 510 that moves first optical device 806 from a first coupling position (e.g., as shown in FIG. 9A) to a second coupling position (e.g., as shown in FIG. 9B). For example, the imaging device actuator moves first optical device 806 by causing rotatable optical device mount 804 to rotate (e.g., about axis 828).

FIGS. 10A-10B are cross sectional views of an exemplary imaging device 508 that is configurable to have multiple stacked configurations of optical devices 806, 808, 810, 1002. Using a stacked configuration of optical devices provides many possible combinations of optical devices, resulting in a large number of different optical path length options.

In FIG. 10A, first optical device 806 and second optical device 808 simultaneously intersect path 826 between image sensor 506 and camera body opening 814 (e.g., first optical device 806 and second optical device 808 are in a "stacked" configuration). For example, first optical device 806 is in a first coupling position (of first optical device 806) relative to camera body 802, in which first optical device 806 intersects path 826 between image sensor 506 and camera body opening 814, and second optical device 808 is in a first coupling position (of second optical device 808) relative to camera body 802, in which second optical device 808 intersects path 826 between image sensor 506 and camera body opening 814. When first optical device 806 and second optical device 808 simultaneously intersect path 826 between image sensor 506 and camera body opening 814, the optical path length between camera body opening 814 and image sensor 506 is:

$$\text{OPL (First Optical Device and Second Optical Device)} = n_{air}d_1 + n_{fod}d_2 + n_{air}d_3 + n_{sod}d_4 + n_{air}d_5$$

In some embodiments, OPL (First Optical Device and Second Optical Device) is different from OPL (First Optical Device) and OPL (Second Optical Device) as described with regard to FIGS. 9A-9B. But the relative movement of first optical device 806 and second optical device 808 along path 826 or the sequence of the two optical devices does not change the optical path length, OPL (First Optical Device and Second Optical Device).

In FIG. 10B, first optical device 806 is in a second coupling position (of first optical device 806) relative to camera body 802, in which first optical device 806 does not intersect path 826 between image sensor 506 and camera body opening 814, and second optical device 808 is in a second coupling position (of second optical device 808) relative to camera body 802, in which second optical device 808 does not intersect path 826 between image sensor 506 and camera body opening 814. When first optical device 806 and second optical device 808 simultaneously do not intersect path 826 between image sensor 506 and camera body opening 814, the optical path length between camera body opening 814 and image sensor 506 is:

$$\text{OPL (No Optical Device)} = n_{air}d$$

In some embodiments, OPL (No Optical Device) is different from OPL (First Optical Device and Second Optical Device), OPL (First Optical Device), and OPL (Second Optical Device).

In some embodiments, imaging device actuator 510 moves a single optical device (e.g., each of first optical device 806, second optical device 808, third optical device 810, and/or fourth optical device 1002 are moved by different imaging device actuators 510). For example, first optical device 806 is pivoted from a first coupling position (e.g., as shown in FIG. 10A) to a second coupling position (e.g., as shown in FIG. 10B) by imaging device actuator 510.

FIG. 11A is a cross sectional view of an exemplary imaging device 508 that includes optical devices for continuous adjustment of an optical parameter.

In FIG. 11A, image sensor 506, first continuous optical device 1102 and second continuous optical device 1104 are coupled to camera body 802. First continuous optical device 1102 is movable relative to, e.g., imaging sensor 506 and/or second continuous optical device 1104.

In some embodiments, first continuous optical device 1102 is coupled to a track 1106. In some embodiments, actuator 510a moves first continuous optical device 1102 along track 1106. In some embodiments, first continuous optical device 1102 and second continuous optical device 1104 are movable relative to imaging sensor 506 (and/or camera body 802). For example, second continuous optical device 1104 is coupled to a track 1108 and actuator 510b moves second continuous optical device 1104 along track 1108. In some embodiments, tracks 1106 and 1108 move first continuous optical device 1102 and second continuous optical device 1104, respectively, in a longitudinal direction, and first continuous optical device 1102 and/or second continuous optical device 1104 also move in a latitudinal direction. For example, second continuous optical device 1104 is moved in a latitudinal direction along track 1116 (e.g., by an actuator 510c). In some embodiments, first continuous optical device 1102 and/or second continuous moves in a diagonal or other direction.

In some embodiments, first continuous optical device 1102 and/or second continuous optical device 1104 has a triangular prism shape (e.g., a right triangular prism shape). For example, first continuous optical device 1102 with a triangular prism shape has a first surface 1112 and second continuous optical device 1104 with a triangular prism shape has a second surface 1114 and, as first continuous optical device 1102 moves relative to imaging device 506, first surface 1112 is in continuous contact with second surface 1114. For example, surface 1112 of first continuous optical device 1102 is in continuous contact with second surface 1114 of second continuous optical device 1104 as first continuous optical device 1102 moves from a first location relative to imaging device 506 (e.g., as shown in FIG. 12A), to a second location relative to imaging device 506 (e.g., as shown in FIG. 12B). In some embodiments, first continuous optical device 1102 and/or second continuous optical device 1104 move along a first axis (e.g., along track 1106 and/or 1108) and along a second axis (e.g., along track 1116), to facilitate continuous contact between surface 1112 and second surface 1114. In some embodiments, first continuous optical device 1102 and second continuous optical device 1104 have the same refractive index (e.g., they are made of the same material). In some embodiments, first continuous optical device 1102 includes a first material having a first refractive index and second continuous optical device 1104 includes a second material having a second refractive index that is different from the first refractive index.

In some embodiments, first continuous optical device 1102 and/or second continuous optical device 1104 has a variable thickness (e.g., a continually decreasing thickness) along an axis that is orthogonal to path 826. For example, first continuous optical device 1102 moves along an axis of movement of the optical device (e.g., along track 1106).

In some embodiments, first continuous optical device 1102 and/or second continuous optical device 1104 has a variable refractive index along an axis of the optical device that is orthogonal to path 826. For example, first optical device 1102 moves along an axis that is parallel to an axis of movement of the optical device (e.g., along track 1106).

In some embodiments, first continuous optical device 1102 and/or second continuous optical device 1104 has a first wall (e.g., 1110, as shown in FIGS. 11A-11B) that is parallel to path 826 and a second side of device 1104 that is opposite the first wall is shorter than the first wall (e.g., the second side of the optical device opposite first wall 1110 is a short wall in lieu of the point shown in FIG. 11A). In some embodiments, first continuous optical device 1102 and/or second continuous optical device 1104 have a rectangular prism shape (e.g., fabricated from a non-uniform material such that the refractive index of optical device 1104 that continuously changes along an axis of the rectangular prism that is orthogonal to path 826). In some embodiments, first continuous optical device 1102 has a first thickness and second continuous optical device 1104 has a second thickness that is different from the first thickness.

FIG. 11B is a front view of first optical device 1102, second optical device 1104, and tracks 1106, 1108, and 1116, along path 826. Note that shade region 1118 corresponds to the region where first surface 1112 of first continuous optical device 1102 is in continuous contact with second surface 1114 of second continuous optical device 1104. As shown in FIG. 11A, the sum of thickness of the two optical devices is the same within this region and the sum of thickness varies when there is relative movement between the two optical devices as described below in connection with FIGS. 12A and 12B.

FIGS. 12A and 12B illustrate movement of first continuous optical device 1102 and second continuous optical device 1104 relative to image sensor 506.

In FIG. 12A, first continuous optical device 1102 has a first position relative to image sensor 506 (and a first position relative to camera body 802) and second continuous optical device 1102 has a first position relative to image sensor 506 (and a first position relative to camera body 802).

In FIG. 12B, first continuous optical device 1102 has a second position relative to image sensor 506 (and a second position relative to camera body 802) and second continuous optical device 1102 has a second position relative to image sensor 506 (and a second position relative to camera body 802).

Movement of first continuous optical device 1102 relative to image sensor 506 continuously adjusts an optical path length along path 826 between camera body opening 814 and image sensor 506 because the sum of thickness of the two optical devices in region 1118 changes. For example, as a first continuous optical device 1102 having a triangular prism shape moves along an axis that is orthogonal to path 826 (e.g., along track 1106), the amount of material of first continuous optical device 1102 that intersects path 826 changes (e.g., increases as first continuous optical device 1102 moves toward second continuous optical device 1104 and decreases as first continuous optical device 1102 moves away from second continuous optical device 1104). When a greater amount of material of first continuous optical device 1102 intersects path 826, first continuous optical device 1102 has a greater impact on the optical path length along path 829 from camera body opening 814 to image sensor 506. Similarly, when a greater amount of material of second continuous optical device 1104 intersects path 826, second continuous optical device 1104 has a greater impact on the optical path length along path 829 from camera body opening 814 to image sensor 506.

When first continuous optical device 1102 is at a first position relative to image sensor 506 and second continuous optical device 1104 is at a first position relative to image sensor 506, as shown in FIG. 12A, and first continuous optical device 1102 and second continuous optical device 1104 have the same refractive index mod, the optical path length between camera body opening 814 and image sensor 506 is:

OPL (First Optical Device and Second Optical Device)=$n_{air}d_1+n_{cod}d_2+n_{air}d_3$ When first continuous optical device 1102 is at a second position relative to image sensor 506 and second continuous optical device 1104 is at a second position relative to image sensor 506, as shown in FIG. 12B, and first continuous optical device 1102 and second continuous optical device 1104 have the same refractive index mod, the optical path length between camera body opening 814 and image sensor 506 is:

OPL (First Optical Device and Second Optical Device)=$n_{air}d_1+n_{cod}d_4+n_{air}d_3$.

First continuous optical device 1102 and/or second continuous optical device 1104 are movable such that a continuous range of optical path length values (e.g., along path 826) are obtainable.

Figure 13:
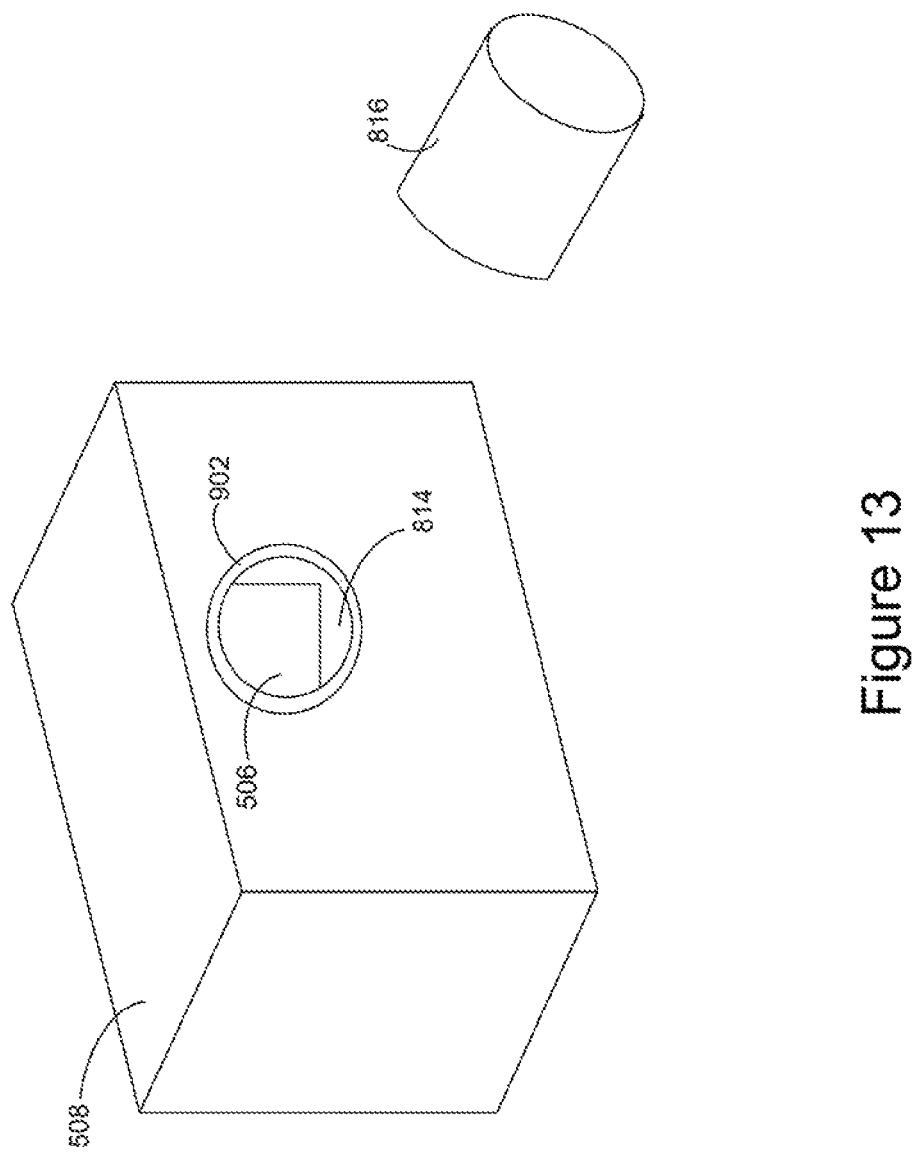
FIG. 13 is a perspective view of an exemplary imaging device, in accordance with some embodiments.

FIG. 13 is a perspective view of an exemplary imaging device 508, in accordance with some embodiments. In FIG. 13, camera lens 816 is not coupled to imaging device 508. Image sensor 506 is visible through camera body opening 814.

FIGS. 14A-14B are a flow diagram illustrating a method 1400 for adjusting an optical path length, in accordance with some embodiments. The method 1400 is performed at a device, such as movable object 102 (e.g., imaging device 508), control unit 108 and/or computing device 110. For example, instructions for performing the method 1400 are stored in imaging device adjustment module 306 of memory 204 (and/or in memory 604 and/or 704) and executed by processor(s) 202 (and/or by processor(s) 412, 504, 602, and/or 702).

The device moves (1402) a first optical device (e.g., first optical device 806) to a first coupling position of the first optical device (e.g., as shown in FIG. 9A or as shown in FIG. 10A) in accordance with a first received optical control instruction, such as an optical control instruction described with regard to actuator 510 (FIG. 5). In the first coupling position of the first optical device, the first optical device is located at a position that intersects a path (e.g., path 826) between image sensor 506 and the camera body opening 814.

The device moves (1404) the first optical device (e.g., first optical device 806) to a second coupling position of the first optical device (e.g., as shown in FIG. 9B or as shown in FIG. 10B) in accordance with a second received optical control instruction, such as an optical control instruction described with regard to actuator 510 (FIG. 5). In some embodiments, in the second coupling position of the first optical device, the first optical device is located at a position that does not intersect the path between the image sensor 506 and the camera body opening 814.

In some embodiments, the first coupling position of the first optical device (e.g., first optical device 806) corresponds (1406) to a first optical path length between the image sensor 506 and the camera body opening 814 (e.g., OPL (First Optical Device), as described with regard to FIG. 9A; OPL (First Optical Device and Second Optical Device), as described with regard to FIG. 10A) and the second coupling position of the first optical device corresponds to a second optical path length between the image sensor and the camera body opening that is different from the first optical path length between the image sensor and the camera body opening (e.g., OPL (Second Optical Device), as described with regard to FIG. 9B; OPL (No Optical Device), as described with regard to FIG. 10B).

In some embodiments, the device moves (1408) a second optical device (e.g., second optical device 808) to a first coupling position of the second optical device in accordance with a third received optical control instruction, such as an optical control instruction described with regard to actuator 510 (FIG. 5). In some embodiments, the third optical control instruction is a part of the first or second control instruction. In some embodiments, the third optical control instruction is distinct from the first and/or second optical control instructions. In some embodiments, in the first coupling position of the second optical device (e.g., second optical device 808), the second optical device is located at a position that intersects a path between the image sensor and the camera body opening (e.g., as shown in FIG. 9B or as shown in FIG. 10A).

In some embodiments, the first optical device (e.g., first optical device 806) is in the first coupling position (1410) of the first optical device (such that the first optical device intersects the path between the image sensor 506 and the camera body opening 814) and, simultaneously, the second optical device (e.g., second optical device 808) is in the first coupling position of the second optical device (such that the second optical device intersects the path between the image sensor 506 and the camera body opening 814) resulting in a third optical path length (that is different from the first optical path length between the image sensor and the camera body opening and the second optical path length between the image sensor and the camera body opening, e.g., OPL (First Optical Device and Second Optical Device), as described with regard to FIG. 10A) between the image sensor 506 and the camera body opening 814.

In some embodiments, the device moves (1412) the second optical device (e.g., second optical device 808) to a second coupling position of the second optical device in accordance with a fourth received optical control instruction, such as an optical control instruction described with regard to actuator 510 (FIG. 5) In some embodiments, in the second coupling position of the second optical device, the second optical device is located at a position that does not intersect the path between the image sensor 506 and the camera body opening 814 (e.g., as shown in FIG. 9A or as shown in FIG. 10B). In some embodiments, the fourth optical control instruction is a part of the first, second, and/or third control instruction. In some embodiments, the fourth optical control instruction is distinct from the first, second, and/or third optical control instructions.

In some embodiments, the first optical device (e.g., first optical device 806) is in the second coupling position (1414) of the first optical device (such that the first optical device does not intersect the path between the image sensor 506 and the camera body opening 814) and, simultaneously, the second optical device (e.g., second optical device 808) is in the second coupling position of the second optical device (such that the second optical device does not intersect the path between the image sensor 506 and the camera body opening 814) resulting in a fourth optical path length (that is different from the first optical path length, the second optical path length, and the third optical path length, e.g., OPL (No Optical Device), as described with regard to FIG. 10B) between the image sensor 506 and the camera body opening 814.

Figure 15:
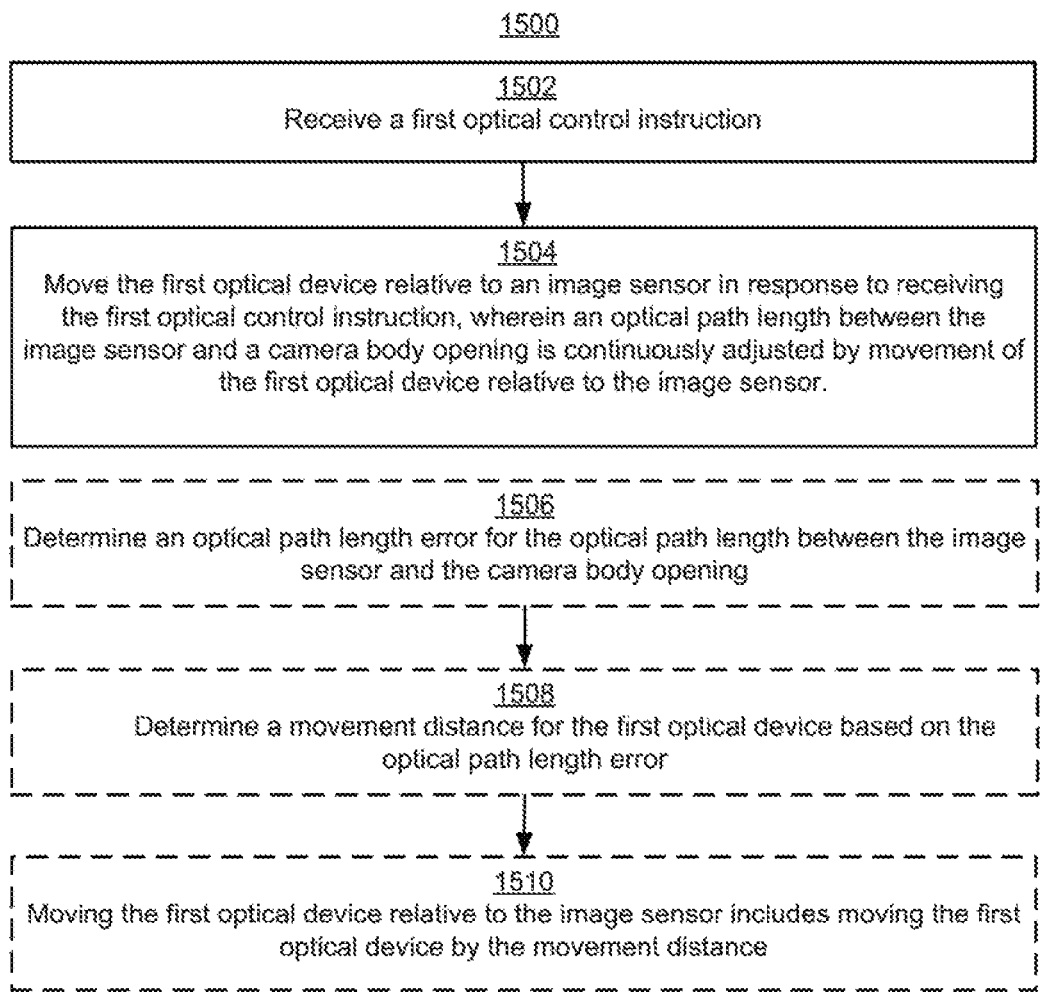
FIG. 15 is a flow diagram illustrating a method for adjusting an optical path length, in accordance with some embodiments.

FIG. 15 is a flow diagram illustrating a method 1500 for adjusting an optical path length, in accordance with some embodiments. The method 1500 is performed at a device, such as movable object 102 (e.g., imaging device 508), control unit 108 and/or computing device 110. For example, instructions for performing the method 1400 are stored in imaging device adjustment module 306 of memory 204 (and/or in memory 604 and/or 704) and executed by processor(s) 202 (and/or by processor(s) 412, 504, 602, and/or 702).

The device receives (1502) a first optical control instruction (such as an optical control instruction described with regard to actuator 510 (FIG. 5)).

The device moves (1504) a first optical device (e.g., first continuous optical device 1112) relative to an image sensor 506 in response to receiving the first optical control instruction. An optical path length between the image sensor and a camera body opening is continuously adjusted by movement of the first optical device relative to the image sensor 506.

In some embodiments, the device determines (1506) an optical path length error for the optical path length between the image sensor 506 and the camera body opening 814. An optical path length error is, e.g., data provided by a manufacturer or other entity (e.g., preconfigured in optical path length error 310 of device adjustment module 306 and/or received via communication system 206, 610, and/or 710), data entered by a user (e.g., via input device 608 of control unit 108, via input device 714 of computing device 100, and/or via another device for providing input to movable object 102), and/or data determined by a device (e.g., using optical system analysis module 308 and/or image analysis module 312). In some embodiments, stored optical path length error data 310 is used to adjust one or more optical devices (e.g., to compensate for a known optical path length error, e.g., when movable object 102 and/or imaging device 508 is initially powered on). For example, a move distance for an optical device (e.g., optical device 806, 808, 810, 818,

820, 822, 824, 1002, 1102, and/or 1104) is determined based on an optical path length error (e.g., stored by optical path length error data 310).

In some embodiments, the device determines (1508) a movement distance for the first optical device based on the optical path length error. In some embodiments, moving the first optical device relative to image sensor 506 includes (1510) moving the first optical device by the movement distance.

FIG. 16 is a flow diagram illustrating a method 1600 for adjusting an optical path length, in accordance with some embodiments. The method 1600 is performed at a device, such as movable object 102 (e.g., imaging device 508), control unit 108 and/or computing device 110. For example, instructions for performing the method 1400 are stored in imaging device adjustment module 306 of memory 204 (and/or in memory 604 and/or 704) and executed by processor(s) 202 (and/or by processor(s) 412, 504, 602, and/or 702).

The device receives (1602) an optical control instruction (such as an optical control instruction described with regard to actuator 510 (FIG. 5)) to move a first optical device (e.g., first optical device 806, first continuous optical device 1002) that is movably coupled to a camera body 802 from a first position to a second position (e.g., as illustrated at FIG. 9A-9B, 10A-10B, or 12A-12B). When the first optical device is in the first position, a first optical path length occurs between an image sensor 506 coupled to the camera body 802 and a camera body opening 814 of the camera body 802 (e.g., OPL (First Optical Device), as described with regard to FIG. 9A; OPL (First Optical Device and Second Optical Device), as described with regard to FIG. 10A or FIG. 12A).

In response to receiving the optical control instruction, the device moves (1604) the first optical device from the first position to the second position to produce a second optical path length, different from the first optical path length (e.g., OPL (Second Optical Device), as described with regard to FIG. 9B; OPL (No Optical Device), as described with regard to FIG. 10B, or OPL (First Optical Device and Second Optical Device) as described with regard to FIG. 2B), between the image sensor 506 and the camera body opening 814.

In some embodiments, the imaging device 508 includes (1606) a second optical device (e.g., second optical device 808). The first optical device (e.g., first optical device 806) and the second optical device (e.g., second optical device 808) are mounted to a platform (e.g., rotatable optical device mount 804). In some embodiments, the platform rotates in a plane that is orthogonal to a path (e.g., 826) between the image sensor 506 and the camera body opening 814.

In some embodiments, the first optical device (e.g., first optical device 806) is at the first position (1608) when the platform has a first rotational position relative to the camera body (e.g., as illustrated in FIG. 10A) and the first optical device is at the second position when the platform has a second rotational position relative to the camera body (e.g., as illustrated in FIG. 10B).

In some embodiments, the imaging device 508 includes (1610) a second optical device (e.g., second continuous optical device 1104). In some embodiments, the first optical device (e.g., first continuous optical device 1102) comprises a first optical element that comprises a first surface (e.g., 1112) and the second optical device comprises a second optical element that comprises a second surface (e.g., 1114). In some embodiments, the method further comprises moving the first optical device relative to the second optical device such that the first surface is in continuous contact with the second surface.

Many features of the present disclosure can be performed in, using, or with the assistance of hardware, software, firmware, or combinations thereof. Consequently, features of the present disclosure may be implemented using a processing system. Exemplary processing systems (e.g., processor(s) 202, 412, 504, 602, and/or 702) include, without limitation, one or more general purpose microprocessors (for example, single or multi-core processors), application-specific integrated circuits, application-specific instruction-set processors, field-programmable gate arrays, graphics processing units, physics processing units, digital signal processing units, coprocessors, network processing units, audio processing units, encryption processing units, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 204, 604, 704) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., communication systems 206, 610, 710) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A system for adjusting an optical path length, comprising:
   a camera body having a camera body opening;
   an image sensor coupled to the camera body;
   a first optical device movably coupled to the camera body via a first actuator, the first actuator being configured to move the first optical device to a first plurality of longitudinal coupling positions; and
   a second optical device movably coupled to the camera body via a second actuator and a third actuator, the second actuator being configured to move the second optical device to a second plurality of longitudinal coupling positions, and the third actuator being configured to move the second optical device to a plurality of latitudinal positions;
   wherein:
      the first and the second optical devices have variable thicknesses along the longitudinal direction; and
      the first, the second, and the third actuators are controlled to move the first and the second optical devices to continuously vary a combined thickness of the first and the second optical devices that intersects a path between the image sensor and the camera body opening while keeping the first and the second optical devices in contact, the combined thickness being continuously varied between a first combined thickness and a second combined thickness different from the first combined thickness, and the first and the second optical devices being kept in a continuous contact during a continuous change in the combined thickness from the first combined thickness to the second combined thickness.

2. The system of claim 1, wherein:
   the first plurality of longitudinal coupling positions of the first optical device correspond to a first plurality of optical path lengths between the image sensor and the camera body opening, and
   the second plurality of longitudinal coupling positions of the second optical device correspond to a second plurality of optical path lengths between the image sensor and the camera body opening.

3. The system of claim 1, wherein the camera body is coupled to an unmanned aerial vehicle (UAV).

4. The system of claim 1, wherein the first optical device includes a first triangular prism and the second optical device includes a second triangular prism.

5. The system of claim 1, wherein the first optical device comprises a solid material that has a flat surface orthogonal to the path between the image sensor and the camera body opening.

6. The system of claim 1, wherein the first optical device comprises a fluid-filled or vacuum chamber.

7. The system of claim 1, wherein the camera body comprises a lens mount at a location corresponding to the camera body opening.

8. The system of claim 7, wherein the lens mount comprises a lens mount flange and at least one lens is coupled to the lens mount flange.

9. The system of claim 1, wherein:
the first plurality of longitudinal coupling positions of the first optical device includes one or more positions where the first optical device does not intersect the path between the image sensor and the camera body opening; and
the second plurality of longitudinal coupling positions of the second optical device includes one or more positions where the second optical device does not intersect the path between the image sensor and the camera body opening.

10. The system of claim 1, wherein the first optical device is coupled to a first movable optical device mount and the second optical device is coupled to a second movable optical device mount.

11. The system of claim 1, further comprising:
one or more processors;
wherein the one or more processors are configured for sending instructions to the first, the second, and the third actuators for:
moving the first and the second optical devices to continuously vary the combined thickness of the first and the second optical devices that intersects a path between the image sensor and the camera body opening while keeping the first and the second optical devices in contact.

12. The system of claim 11, wherein the one or more processors are configured for sending instructions to the first, the second, and the third actuators for moving the first and the second optical devices in response to detected user input.

13. The system of claim 11, wherein the one or more processors are configured for sending instructions to the first, the second, and the third actuators for moving the first and the second optical devices in response to an instruction received from a remote device.

14. The system of claim 11, wherein the one or more processors are configured for sending instructions to the first, the second, and the third actuators for moving the first and the second optical devices based on data generated by the image sensor.

* * * * *